(12) United States Patent
Zisapel et al.

(10) Patent No.: US 8,484,374 B2
(45) Date of Patent: Jul. 9, 2013

(54) LOAD BALANCING

(75) Inventors: Roy Zisapel, Tel Aviv (IL); Amir Peles, Tel Aviv (IL); Smadar Fuks, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 13/566,171

(22) Filed: Aug. 3, 2012

(65) Prior Publication Data

US 2012/0303784 A1  Nov. 29, 2012

Related U.S. Application Data

(60) Continuation of application No. 10/449,016, filed on Jun. 2, 2003, now Pat. No. 8,266,319, which is a division of application No. 09/467,763, filed on Dec. 20, 1999, now Pat. No. 6,665,702, which is a continuation-in-part of application No. 09/115,643, filed on Jul. 15, 1998, now Pat. No. 6,249,801.

(51) Int. Cl.
  *G06F 11/30* (2006.01)

(52) U.S. Cl.
  USPC ............ 709/241; 709/238; 709/245; 718/105

(58) Field of Classification Search
  USPC .................. 709/238–244, 245; 718/105, 104, 718/102
  See application file for complete search history.

(56) References Cited

U.S. PATENT DOCUMENTS

| | | | |
|---|---|---|---|
| 4,495,570 A | 1/1985 | Kitajima et al. | |
| 4,884,263 A | 11/1989 | Suzuki | |
| 4,953,162 A | 8/1990 | Lyons et al. | |
| 5,349,682 A | 9/1994 | Rosenberry | |
| 5,491,786 A | 2/1996 | Egan et al. | |
| 5,511,168 A | 4/1996 | Perlman et al. | |
| 5,774,660 A | 6/1998 | Brendel et al. | |
| 5,805,586 A | 9/1998 | Perreault et al. | |
| 5,884,038 A | 3/1999 | Kapoor | |
| 5,915,095 A | 6/1999 | Miskowiec | |
| 5,951,634 A | 9/1999 | Sitbon et al. | |
| 6,006,264 A * | 12/1999 | Colby et al. | 709/226 |
| 6,038,599 A | 3/2000 | Black et al. | |
| 6,047,329 A | 4/2000 | Horikawa et al. | |

(Continued)

FOREIGN PATENT DOCUMENTS

| | | |
|---|---|---|
| JP | 2000-311130 | 11/2000 |
| WO | 01/41362 | 6/2001 |

OTHER PUBLICATIONS

Samrat Bhattacharjee, et al., "Application Layer Anycasting"; Networking and Telecommunications Group, College of Computing, Georgia Institute of Technology, Atlanta, GA.; INFOCOM '97; Apr. 1997.

(Continued)

*Primary Examiner* — Kenneth R Coulter
(74) *Attorney, Agent, or Firm* — Myers Wolin, LLC

(57) ABSTRACT

A network management system, device and method for managing a computer network. The device is connected to the Internet through a plurality of routes, wherein the plurality of routes are assigned with respective IP addresses. The device includes a controller receiving a DNS resolution query from a remote computer for a domain name within the computer network, selecting one of the plurality of routes connecting the device to the Internet, and responding to the DNS resolution query with an IP address associated with the selected route. The IP address is used for resolution of the domain name.

15 Claims, 20 Drawing Sheets

U.S. PATENT DOCUMENTS

| | | | |
|---|---|---|---|
| 6,067,545 | A | 5/2000 | Wolff |
| 6,070,191 | A | 5/2000 | Narendran et al. |
| 6,078,943 | A | 6/2000 | Yu |
| 6,078,953 | A | 6/2000 | Vaid et al. |
| 6,092,178 | A | 7/2000 | Jindal et al. |
| 6,098,091 | A | 8/2000 | Kisor |
| 6,098,108 | A | 8/2000 | Sridhar et al. |
| 6,115,752 | A | 9/2000 | Chauhan |
| 6,119,170 | A | 9/2000 | Schoffelman et al. |
| 6,122,743 | A | 9/2000 | Shaffer et al. |
| 6,138,159 | A | 10/2000 | Phaal |
| 6,167,438 | A | 12/2000 | Yates |
| 6,182,139 | B1 | 1/2001 | Brendel |
| 6,185,619 | B1 | 2/2001 | Joffe et al. |
| 6,205,146 | B1 | 3/2001 | Rochberger et al. |
| 6,249,800 | B1 | 6/2001 | Aman et al. |
| 6,249,801 | B1 | 6/2001 | Zisapel et al. |
| 6,269,391 | B1 | 7/2001 | Gillespie |
| 6,297,823 | B1 | 10/2001 | Bharali et al. |
| 6,298,383 | B1 | 10/2001 | Gutman et al. |
| 6,304,913 | B1 | 10/2001 | Rune |
| 6,314,093 | B1 | 11/2001 | Mann et al. |
| 6,347,078 | B1 | 2/2002 | Narvaez-Guarieri et al. |
| 6,370,584 | B1 | 4/2002 | Bestavros et al. |
| 6,449,647 | B1* | 9/2002 | Colby et al. ............. 709/226 |
| 6,457,054 | B1 | 9/2002 | Bakshi |
| 6,487,177 | B1 | 11/2002 | Weston-Dawkes |
| 6,502,125 | B1 | 12/2002 | Kenner et al. |
| 6,502,135 | B1 | 12/2002 | Munger et al. |
| 6,542,468 | B1 | 4/2003 | Hatakeyama |
| 6,549,516 | B1 | 4/2003 | Albert et al. |
| 6,601,084 | B1 | 7/2003 | Bhaskaran et al. |
| 6,618,761 | B2 | 9/2003 | Munger et al. |
| 6,650,621 | B1 | 11/2003 | Maki-Kullas |
| 6,665,702 | B1 | 12/2003 | Zisapel et al. |
| 6,680,947 | B1 | 1/2004 | Denecheau et al. |
| 6,687,731 | B1 | 2/2004 | Kavak |
| 6,718,359 | B2 | 4/2004 | Zisapel et al. |
| 6,735,631 | B1 | 5/2004 | Oehrke et al. |
| 6,754,181 | B1 | 6/2004 | Elliott et al. |
| 8,266,319 | B2* | 9/2012 | Zisapel et al. ............. 709/238 |
| 2002/0087722 | A1 | 7/2002 | Datta et al. |
| 2002/0199014 | A1* | 12/2002 | Yang et al. ............. 709/238 |
| 2003/0140142 | A1 | 7/2003 | Marples et al. |

OTHER PUBLICATIONS

German Goldszmidt, et al.; "Load Distribution for Scalable Web Servers: Summer Olympics 1996—a Case Study"; IBM Watson Research Center; 1996.

Mari Korkea-aho; "Scalability in Distributed Multimedia Systems"; Helsinki University of Technology, Laboratory of Information Processing Science; Master's Thesis: Nov. 5, 1995.

Srinivasan Seshan et al.; "SPAND: Shared Passive Network Performance Discovery"; USENIX Symposium on Internet Technologies and Systems; 1997.

Robert L. Carter et al.; "Dynamic Server Selection using Bandwidth Probing in Wide Area Networks"; Computer Science Department, Boston University; Mar. 18, 1996.

Robert L. Carter et al.; "Measuriung Bottleneck Link Speed in Packet-Switched Networks"; Computer Science Department, Boston University; Mar. 15, 1996.

James D. Guyton et al.; "Locating Nearby Copies of Replicated Internet Servers"; University of Colorado at Boulder; Feb. 1995.

Fyodor; "The Art of Port Scanning"; Sep. 1997.

R. Enger et al.; "FYI on a Network Management Tool Catalog: Tools for Monitoring and Debugging TCP/IP Internets and Interconnected Devices"; Network Working Group; Jun. 1993.

Matt Mathis et al.; "Diagnosing Internet Congestion with a Transport Layer Performance Tool"; Proceedings of INET; 1996.

Cisco Distributed Director. Cisco Systems, Inc. 1996.

Deborah Radcliff; "Traffic Jam—includes related articles on long-distance telco revenues, spamming, an emerging high-quality internet2 and Internet use by The National Center for Missing and Exploited Children"; Electronic Commerce—Internet / Web/ Online Service Information; Nov. 1997.

Resonate, Inc.; "Frequently Asked Questions about Resonate Global Dispatch"; Resonate, Inc.; 1997.

FreeBSD Hypertext Man Pages; Mar. 1, 1997.

Mike Muuss; "Using the InterNet Control Message Protocol (ICMP) ECHO facility, measure round-trip delays and packet loss across networks paths"; U.S. Army Ballistic Research Laboratory; Dec. 1983.

Emirical Tools & Technologies; "Dr. Watson (DWTNDA)"; The Network Detective's Assistant v1.2; Nov. 15, 1997.

Russell Mosemann; "Package Net"; PING; 1996.

Traceping; May 14, 1997.

Traceroute—Print the Route Packets take to Network Host; Apr. 22, 1997.

Command-Line Commands Summary; Microsoft; 1995.

Uriel Maimom; "TCP Port Stealth Scanning"; Phrack 49. vol. 7 Issue 49. File 15 of 16; entered in case Apr. 19, 2005.

Internet Protocol: Error and Control Messages (ICMP); entered in case Apr. 19, 2005.

Internet Engineering Task Force. QoS Routing Mechanisms and OSPF Extensions; Nov. 5, 1996.

Kimberly C. Claffy et al; "Measurement Considerations for Assessing Unidirectional Latencies"; Computer Systems Laboratory; San Diego Supercomputer Center; 1993.

Praveen Akkiraju et al.; "Enabling Enterprise Multihoming with Cisco IOS Network Address Translation (NAT)"; Cisco Systems Inc., Online!; 1997.

Yamamoto K.; "Multi-homed Sites I the Ipv6 Environment"; IPNG Working Group, Online!; Jan. 13, 1999.

Greenfield D.; "Radware LinkProof"; Networkmagazine.com, Online! Dec. 1999.

Mark E. Crovella et al.; "Dynamic Server Selection in the Internet"; In Proceedings of the Third IEEE Workshop on the Architecture and Implementation of High Performance Communication Subsytems (HPCS '95); Jun. 30, 1995.

Peter Sanders; "A Detailed Analysis of Random Polling Dynamic Load Balancing"; 1994 International Symposium on Parallel Architectures, Algorithms and Networks, pp. 382-389; 1994

Azer Bestavros; "Speculative Data Dissemination and Service to Reduce Server Load, Network Traffic, and Service Time in Distributed Information System"; IEEE 1996, pp. 180-187; 1996.

Gil-Haeng Lee; "Using System State Information for Adaptive State Polling Policy in Distributed Load Balancing"; 1997 IEEE, pp. 166-173; 1997.

Bruce Hajek; "Performance of Global Load Balancing by Local Adjustment"; Transactions on Information Theory, vol. 36, Issue 6: pp. 1398-1414; Nov. 1990.

Phillip Krueger et al.; "Adaptive Location Policies for Global Scheduling"; IEEE Transactions on Software Engineering, vol. 20, Issue 6: pp. 432-444; Jun. 1994.

Gil Haeng Lee et al.; "A Sender-Initiated Adaptive Load Balancing Scheme Based on Predictable State Knowledge"; IEICE Transactions on Information and Systems, E79-D:3; pp. 209-221; Mar. 1996.

E. Haddad; "Optimal Load Sharing in Dynamically Heterogeneous Systems"; Proceedings Seventh IEEE Symposium on Parallel and Distributed Processing (Cat. No. 95TB8183): pp. 346-353; 1995.

Gil-Haeng Lee et al.; "An Adaptive Load Balacing Algorithm Using Simple Prediction Mechanism"; Proceedings Ninth International Workshop on Database and Expert Systems Applicatins pp. 496-450; 1998.

B. Bing and R. Subramanian; Abstract of: "An Efficient Multiaccess Technique with Stability Control for Multimedia Personal Communication Networks"; Journal of the Institute of Engineers Singapore; vol. 38, Issue 1:pp. 17-25; 1998.

R.S. Engelschall; "Balancing Your Website, Practical Approaches for Distributing HTTP Traffic"; WEB Techniques, vol. 3, Issue 5: pp. 45-46, 48-50, 52; 1998.

Chin Lu and Sau Ming Lau; Abstract of "A Performance Study on Different Classes of Load Balancing Algorithms"; Proceedings of the Fourteenth International Conference Applied Informatics; pp. 39-42; 1996.

Gil-Haeng Lee et al.: "A Prediction-Based Adaptive Location Policy for Distributed Load Balancing"; Journal of Systems Architecture, vol. 42, Issue 1: pp. 1-18; Aug. 1996.

Gil-Haeng Lee et al.; Abstract of "A Sender-Initiated Adaptive Load Balancing Scheme Based on Predictable State Knowledge"; IEICE Transactions on Information and Systems; vol. E79-D, Issue 3: pp. 209-221; Mar. 1996.

K. Benmohammed-Mahieddine et al.; "A Periodic Symmetrically-Initiated Load Balancing Algorithm for Distributed Systems"; Proceedings of the 14th International Conference on Distributed Computing Systems (Cat. No. 94CH3450-4): pp. 616-623; 1994.

G. Goldszmidt and G. Hunt; "NetDispatcher: A TCP Connection Router"; IBM Research Report, pp. 1-20; RC20853; May 19, 1997.

Hopscotch (TM), "Genuity's Industrial Strength Solution to Net Traffic"; entered in case Apr. 19, 2005.

Rodney Joffe and Henry Heflich; Hopscotch (TM) Optimized Web Access; Mar. 11, 1997.

Aly E. El-Abd et al., "A Neural Network Approach for Dynamic Load Balancing in Homogeneous Distributed Systems"; IEEE 1997; pp. 628-629; 1997.

Pritchard; "Load Balanced Deadlock-Free Deterministic Routing of Arbitrary Networks"; ACM 1992; pp. 225-234; 1992.

Shaikh et al.; "Load-Sensitive Routing of Long-Lived IP Flows"; ACM 1999; pp. 215-226; 1999.

Franco et al.; "A New Method to Make Communication Latency Uniform: Distributed Routing Balancing"; ACM 1999; pp. 210-219; 1999.

Crochat et al.; "A Path Selection Method in ATM Using Pre-Computation"; Proceedings of IZS; Feb. 1996; pp. 1-12.

"Linkproof—The First ISP Load Balancing"; Oct. 10, 1999.

Bates et al.; "Scalable Support for Multi-Homed Multi-Provider Connectivity"; Cisco Systems; Jan. 1998; pp. 1-12.

Bates et al.; "Scalable Support for Multi-Homed Multi-Provider Connectivity"; Cisco Systems; Dec. 1997; pp. 1-11.

Berkowitz; "To be Multihomed: Requirements & Definitions Draft—Berkowitz—Multirqmt-01.txt"; Mar. 1998; pp. 1-16, Internet Draft.

Akkiraju et al.; "A Multihoming Solution Using Nats"; Cisco Systems, Nov. 1998; pp. 1-36.

Akkiraju et al.; "Enabling Enterprise Multihoming With Cisco IOS Network Address Translation" (NAT); Cisco Systems, 1997; pp. 1-25.

Sullivan; "Load Sharing Using IP Address Translations" (LSNAT); Aug. 1998; pp. 1-8.

Brochure: "CSD A Complete Solution for Enhancing Cache Server Farm Performance"; RadWare Ltd., 1997.

Brochure; "WSD-DS"; RadWare Ltd., 1997.

Brochure; "WSD-NP a Powerful Global Load Balancing Solution"; RadWare Ltd., 1997.

Brochure; "WSD, WSD-Pro"; RadWare Ltd., 1997.

B. Gengler; "RND Server Eases Web Site Congestion"; Internetwork, 7(11); 1996.

R. J. Kohlepp; "Web Server Director Keeps Intersections Clear"; Network Computing, 1997.

A. Rogers; "Easing Web Jam With Distributed Servers"; Communications Week, No. 632; 1996.

J. Taschek; "A Well-Balanced Web"; Internet Computing, 1998.

P. Boyle; "Web Site Traffic Cops"; PC Magazine, 1997.

U.S. Appl. No. 60/032,484; entered in case on Aug. 9, 2012.
U.S. Appl. No. 60/042,235; entered in case on Aug. 9, 2012.
U.S. Appl. No. 60/043,502; entered in case on Aug. 9, 2012.
U.S. Appl. No. 60/043,503; entered in case on Aug. 9, 2012.
U.S. Appl. No. 60/043,515; entered in case on Aug. 9, 2012.
U.S. Appl. No. 60/043,524; entered in case on Aug. 9, 2012.
U.S. Appl. No. 60/043,586; entered in case on Aug. 9, 2012.
U.S. Appl. No. 60/043,621; entered in case on Aug. 9, 2012.
U.S. Appl. No. 60/043,691; entered in case on Aug. 9, 2012.
U.S. Appl. No. 60/054,687; entered in case on Aug. 9, 2012.
U.S. Appl. No. 60/084,278; entered in case on Aug. 9, 2012.

* cited by examiner

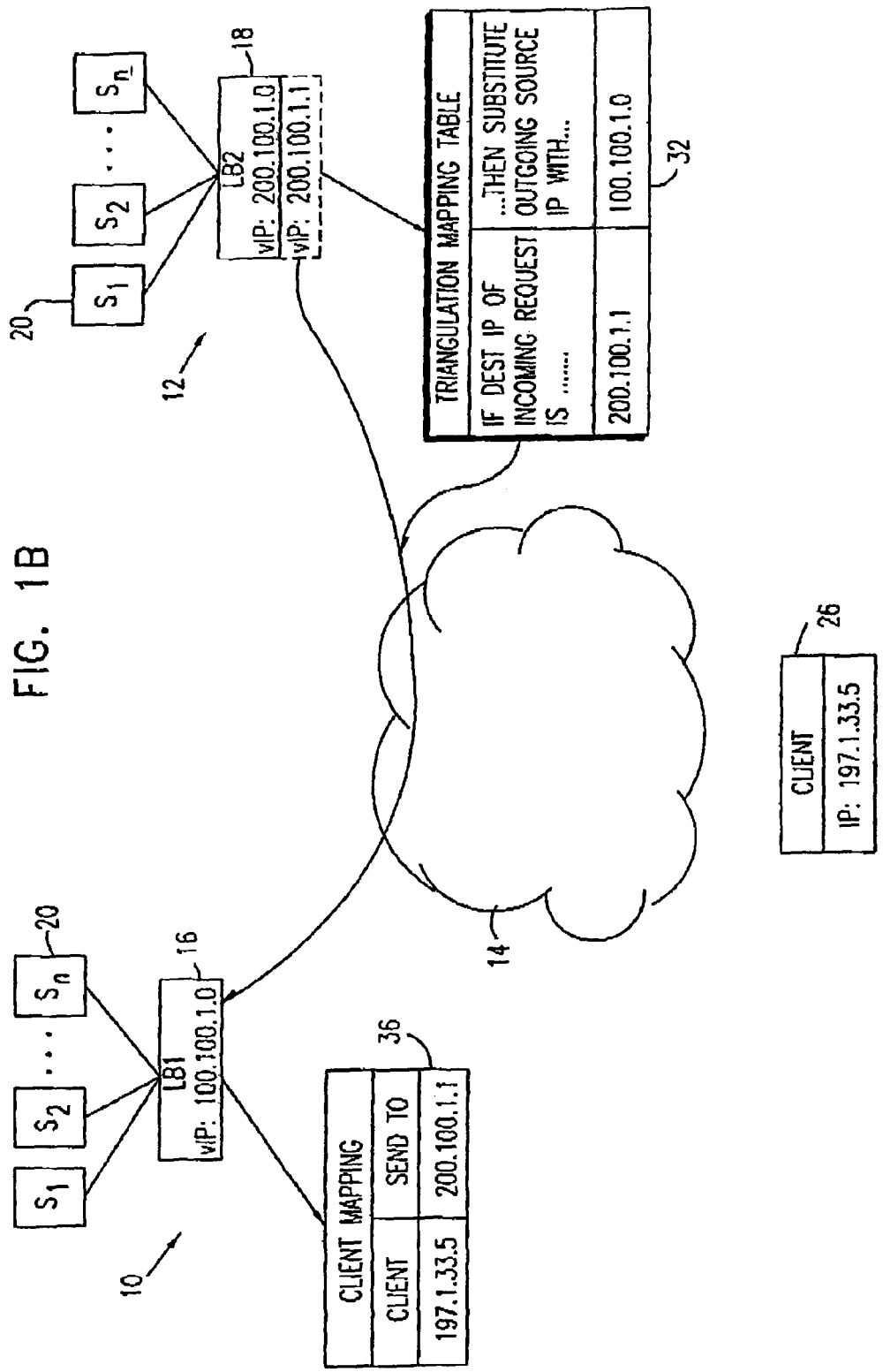

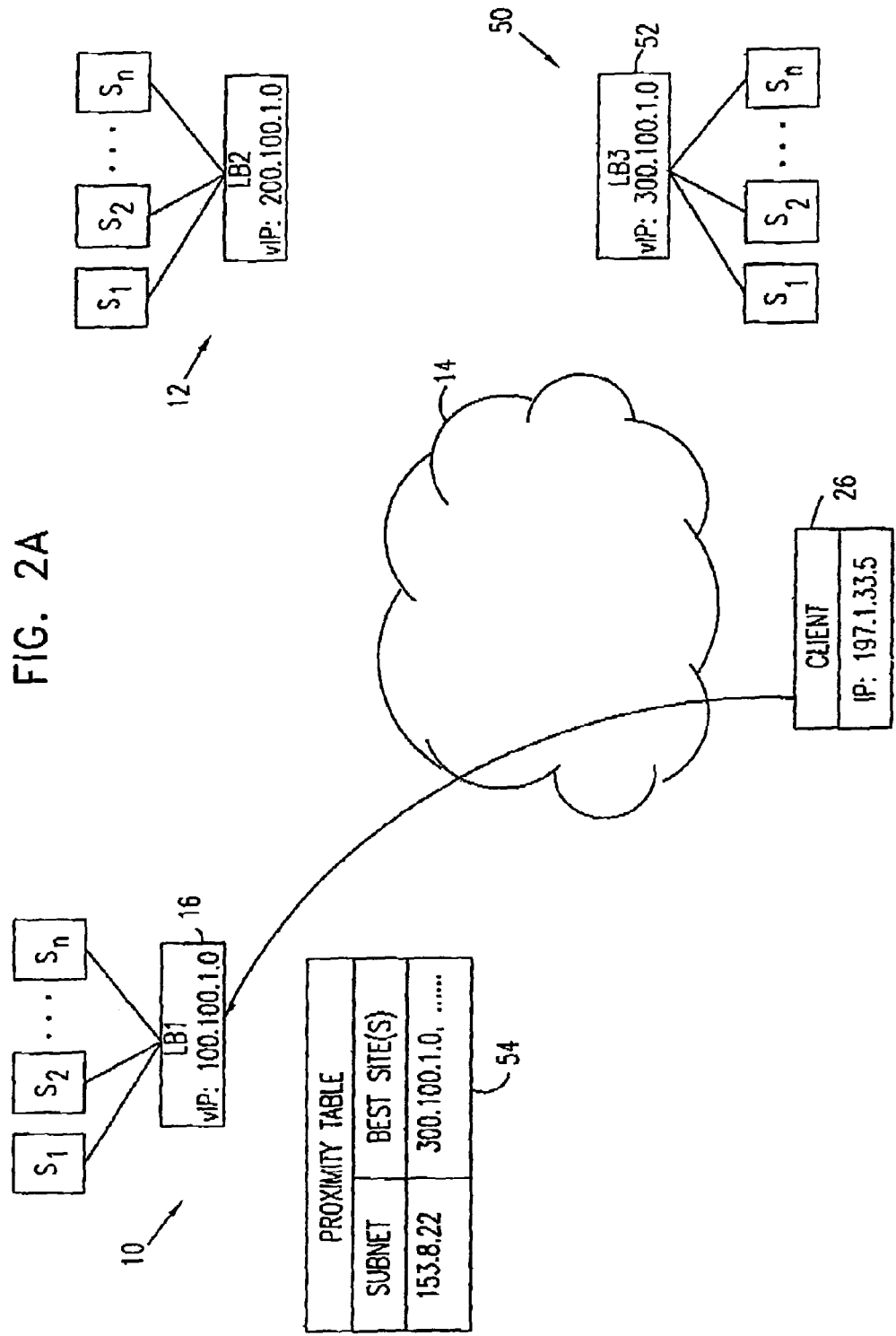

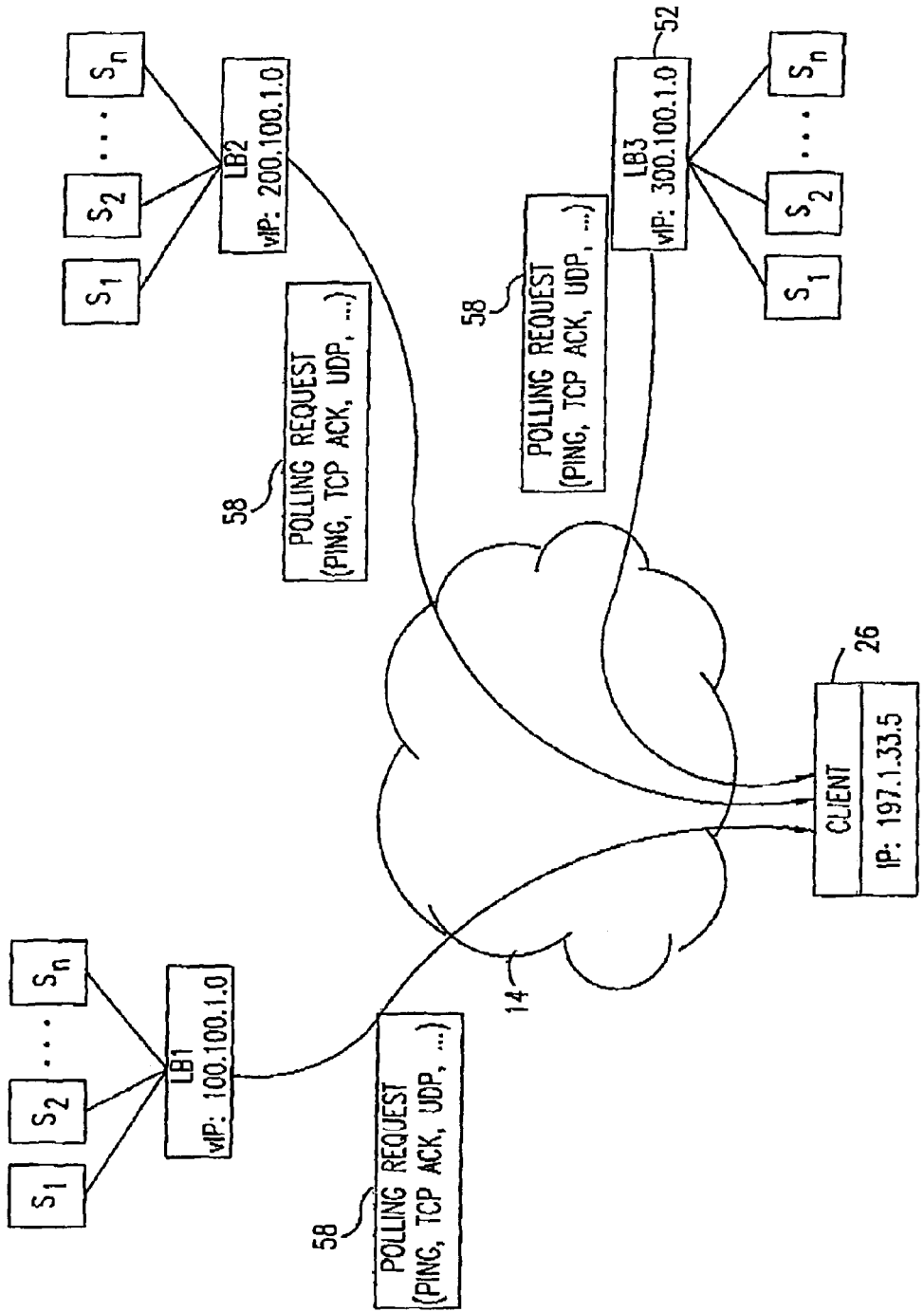

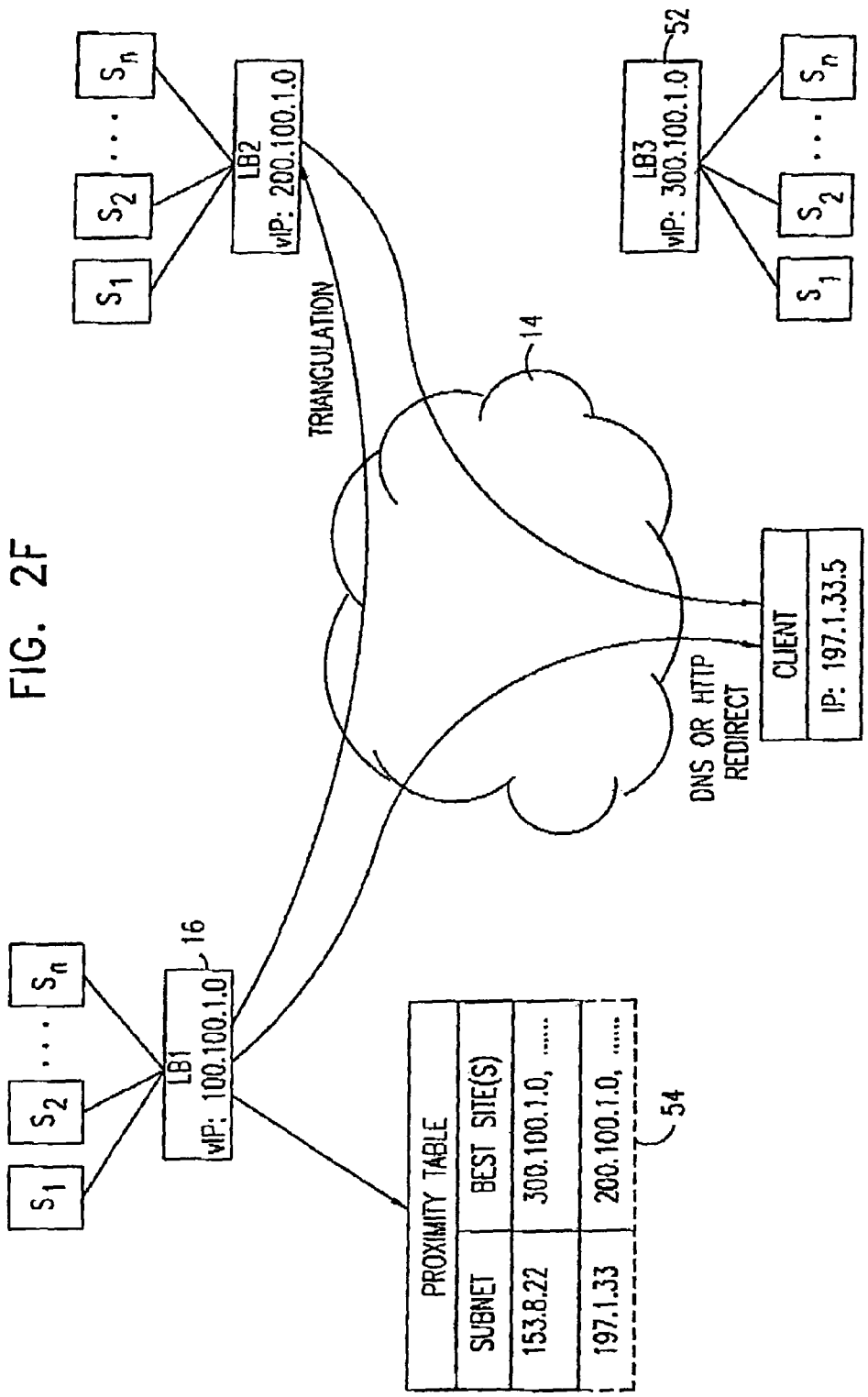

FIG. 7

| DESTINATION TABLE | | ROUTER R₁ | ROUTER R₂ | |
|---|---|---|---|---|
| DESTINATION SUBNET₁ | | HOPS = $h(1,1)$<br>RESPONSE TIME = $t(1,1)$<br>PACKET LOSS = $p(1,1)$ | $h(2,1)$<br>$t(2,1)$<br>$p(2,1)$ | ... |
| DESTINATION SUBNET₂ | | HOPS = $h(1,2)$<br>RESPONSE TIME = $t(1,2)$<br>PACKET LOSS = $p(1,2)$ | $h(2,2)$<br>$t(2,2)$<br>$p(2,2)$ | ... |
| ... | | | | |

LOAD BALANCING

CROSS REFERENCE TO RELATED APPLICATIONS

This application is a continuation of application Ser. No. 10/449,016 filed Jun. 2, 2003, now U.S. Pat. No. 8,266,319. The 10/449,016 Application is a divisional of application Ser. No. 09/467,763 filed Dec. 20, 1999, now U.S. Pat. No. 6,665,702, which is a continuation-in-part of application Ser. No. 09/115,643, filed Jul. 15, 1998, now U.S. Pat. No. 6,249,801. The contents of the above-referenced applications are herein incorporated by reference.

TECHNICAL FIELD

The present invention relates to computer networks in general, and in particular to load balancing client requests among redundant network servers in different geographical locations.

BACKGROUND

In computer networks, such as the Internet, preventing a server from becoming overloaded with requests from clients may be accomplished by providing several servers having redundant capabilities and managing the distribution of client requests among the servers through a process known as "load balancing".

In one early implementation of load balancing, a Domain Naming System (DNS) server connected to the Internet is configured to maintain several IP addresses for a single domain name, with each address corresponding to one of several servers having redundant capabilities. The DNS server receives a request for address translation and responds by returning the list of server addresses from which the client chooses one address at random to connect to. Alternatively, the DNS server returns a single address chosen either at random or in a round-robin fashion, or actively monitors each of the servers and returns a single address based on server load and availability.

More recently, a device known as a "load balancer," such as the Web Server Director, commercially available from the Applicant/assignee, has been used to balance server loads as follows. The load balancer is provided as a gateway to several redundant servers typically situated in a single geographical location and referred to as a "server farm" or "server cluster." DNS servers store the IP address of the load balancer rather than the addresses of the servers to which the load balancer is connected. The load balancer's address is referred to as a "virtual IP address" in that it masks the addresses of the servers to which it is connected. Client requests are addressed to the virtual IP address of the load balancer which then sends the request to a server based on server load and availability or using other known techniques.

Just as redundant servers in combination with a load balancer may be used to prevent server overload, redundant server farms may be used to reroute client requests received at a first load balancer/server farm to a second load balancer/server farm where none of the servers in the first server farm are available to tend to the request. One rerouting method currently being used involves sending an HTTP redirect message from the first load balancer/server farm to the client instructing the client to reroute the request to the second load balancer/server farm indicated in the redirect message. This method of load balancing is disadvantageous in that it can only be employed in response to HTTP requests, and not for other types of requests such as FTP requests. Another rerouting method involves configuring the first load balancer to act as a DNS server. Upon receiving a DNS request the first load balancer simply returns the virtual IP address of the second load balancer. This method of load balancing is disadvantageous in that it can only be employed in response to DNS requests where there is no guarantee that the request will come to the first load balancer since the request does not come directly from the client, and where subsequent requests to intermediate DNS servers may result in a previously cached response being returned with a virtual IP address of a load balancer that is no longer available.

Where redundant server farms are situated in more than one geographical location, the geographical location of a client may be considered when determining the load balancer to which the client's requests should be routed, in addition to employing conventional load balancing techniques. However, routing client requests to the geographically nearest server, load balancer, or server farm might not necessarily provide the client with the best service if, for example, routing the request to a geographically more distant location would otherwise result in reduced latency, fewer hops, or provide more processing capacity at the server.

SUMMARY

Certain embodiment disclosed herein include a method for load balancing client requests among a plurality of internet service provider (ISP) links in a multi-homed network. The method comprises resolving an incoming domain name server (DNS) query for an address associated with a domain name of a server within the multi-homed network, wherein the incoming DNS query is received from a client; selecting, based on at least one load balancing criterion, one ISP link from the plurality ISP links; and returning an internet protocol (IP) address selected from a range of IP addresses associated with the selected ISP link, thereby subsequent requests from the client are routed through the selected ISP link.

Certain embodiment disclosed herein also include a device for load balancing client requests among a plurality of internet service provider (ISP) links in a multi-homed network. The devices comprises a network controller configured to resolve an incoming domain name server (DNS) query for an address associated with a domain name of a server within the multi-homed network, wherein the incoming DNS query is received from a client; and a balancer module configured to select, based on at least one load balancing criterion, one ISP link from the plurality ISP links; wherein the network controller is further configured to return an internet protocol (IP) address selected from a range of IP addresses associated with the selected ISP link, thereby subsequent requests from the client are routed through the selected ISP link.

Certain embodiment disclosed herein also include a method for load balancing traffic among a plurality of data paths between a client and a destination server connected through a network system, each of the plurality of data paths is connected to a router configured with a unique internet protocol (IP) address. The method comprises receiving a data packet from a client; selecting a data path to route the received data packet to the destination server using a decision function, wherein the decision function is based at least on a content type of the received data packet; and routing the received data packet and subsequent data packets from the client to the destination server over the selected data path.

Certain embodiment disclosed herein also include a content router for load balancing traffic among a plurality of data paths between a client and a destination server connected through a network system, each of the plurality of data paths is connected to a router configured with a unique internet protocol (IP) address. The content router comprises an interface for receiving a data packet from a client; a memory for maintaining a decision table summarizing decision functions computed for the destination server for each type of content; and a load balancing module for selecting a data path to route the received data packet to the destination server using a decision function, wherein the decision function is based at least on a content type of the received data packet; wherein the interface is further configured to route the received data packet and subsequent data packets from the client to the destination server over the selected data path.

BRIEF DESCRIPTION OF THE DRAWINGS

The present invention will be understood and appreciated from the following detailed description, taken in conjunction with the drawings in which:

FIGS. 1A-1C, taken together, are simplified pictorial flow illustrations of a triangulation load balancing system constructed and operative in accordance with a preferred embodiment of the present invention;

FIGS. 2A-2F, taken together, are simplified pictorial flow illustrations of a network proximity load balancing system constructed and operative in accordance with another preferred embodiment of the present invention;

FIG. 7 illustrates a typical Destination Table which is compiled by the content router for each router and its respective path in accordance with another preferred embodiment' of the present invention.

DETAILED DESCRIPTION

Figure 1A:
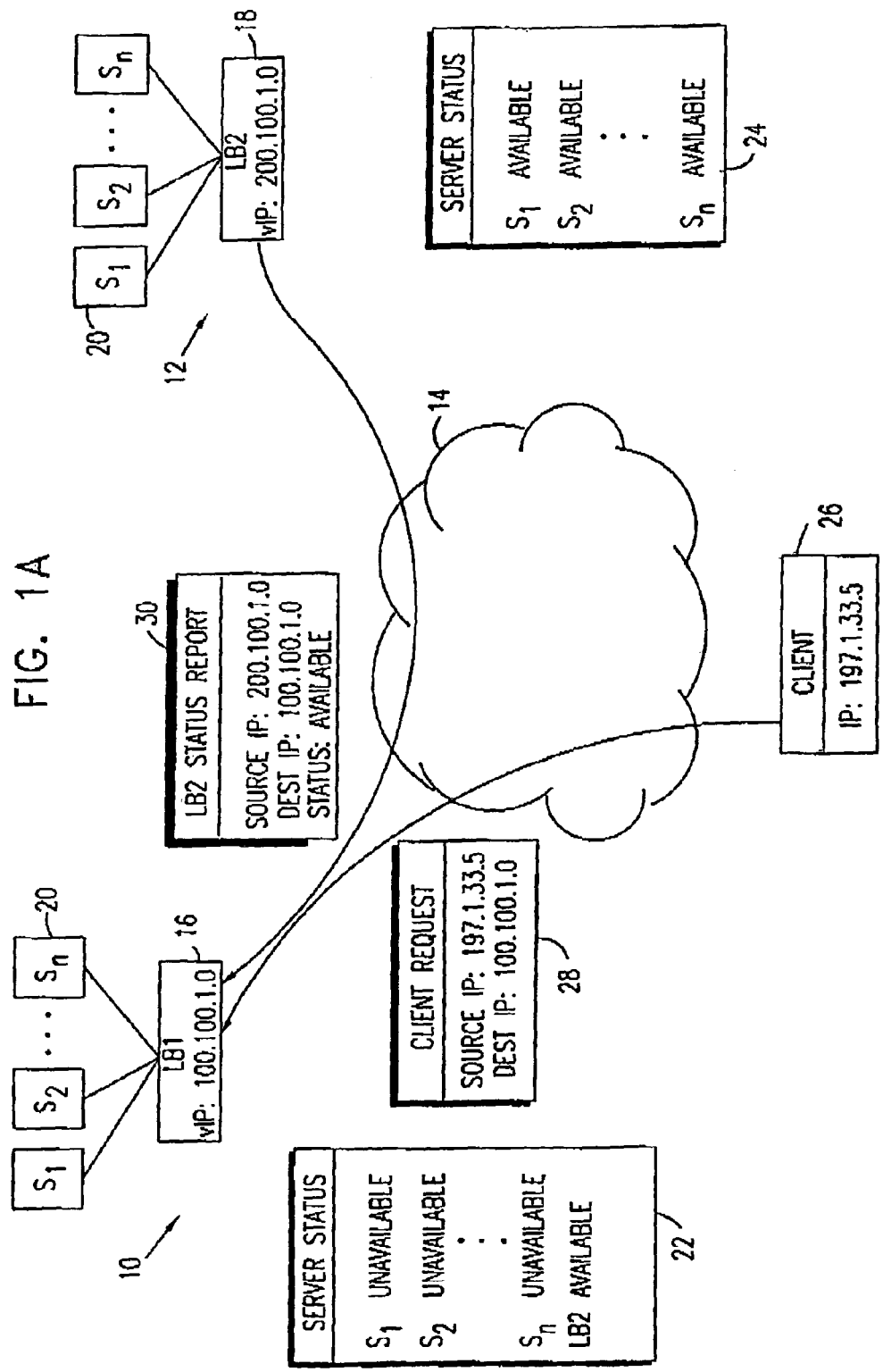
Figure 1C:
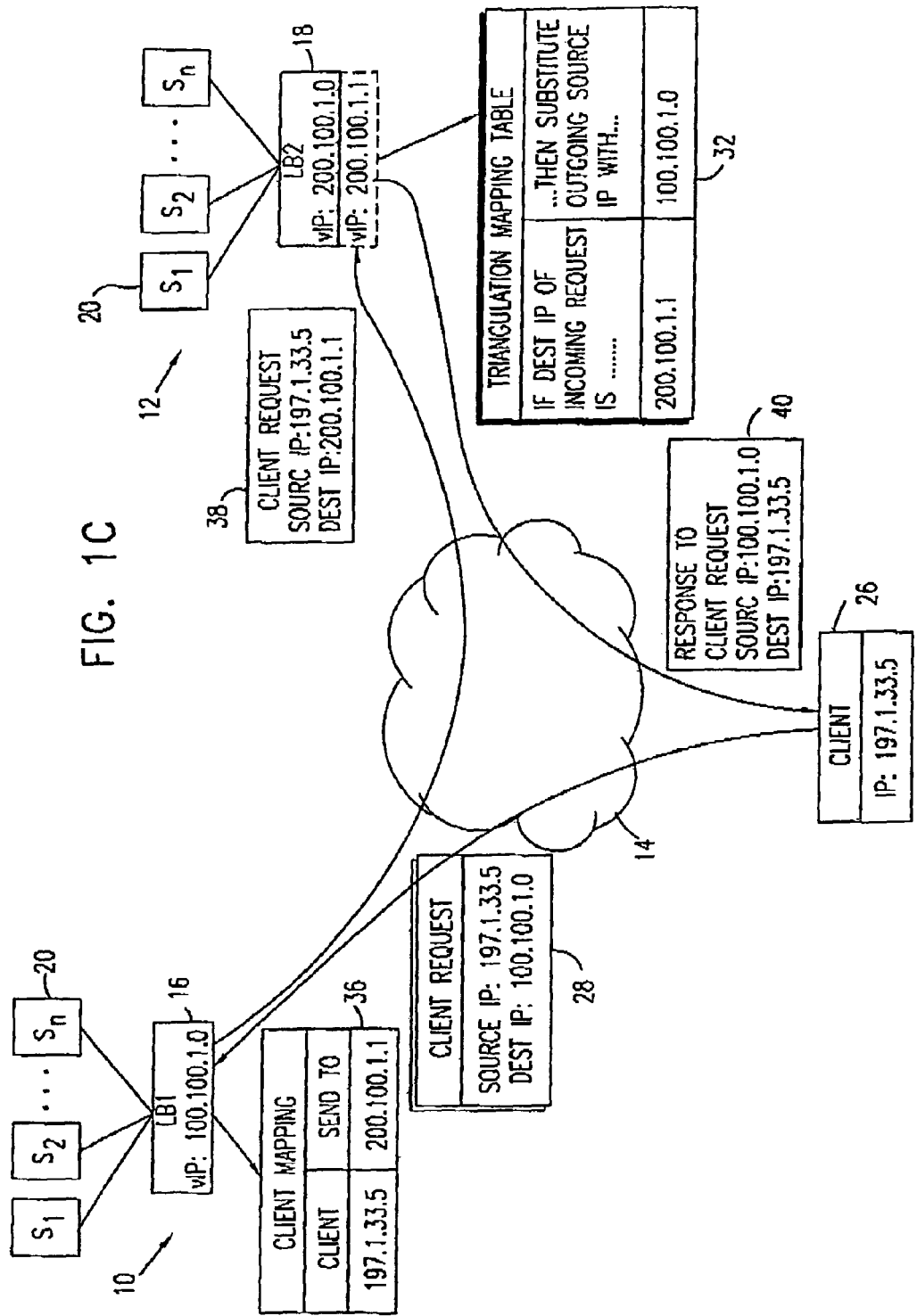

Reference is now made to FIGS. 1A-1C which, taken together are simplified pictorial flow illustrations of a triangulation load balancing system constructed and operative in accordance with a preferred embodiment of the present invention. Two server farms, generally designated 10 and 12 respectively, are shown connected to a network 14, such as the Internet, although it is appreciated that more than two server farms may be provided. Server farms 10 and 12 typically comprise a load balancer 16 and 18 respectively, which may be a dedicated load balancer or a server or router configured to operate as a load balancer, with each of the load balancers being connected to one or more servers 20. Load balancers 16 and 18 are alternatively referred to herein as LB1 and LB2 respectively. LB1 and LB2 typically maintain a server status table 22 and 24 respectively, indicating the current load, configuration, availability, and other server information as is common to load balancers. LB1 and LB2 also typically periodically receive and maintain each other's overall status and load statistics such that LBI and LB2 can know each other's availability.

Typical operation of the triangulation load balancing system of FIGS. 1A-1C is now described by way of example. As is shown more particularly with reference to FIG. IA, a client 26, such as any known computer terminal configured for communication via network 14, is shown sending a request 28, such as an FTP or HTTP request, to LB1 whose virtual IP address is 100.100.1.0. In accordance with network transmission protocols, request 28 indicates the source IP address of the requestor, being the IP address 197.1.33.5 of client 26, and the destination IP address, being the virtual IP address 100.100.1.0 of LBI. LB2 preferably periodically sends a status report 30 to LB1, the virtual IP address 100.100.1.0 of LB1 being known in advance to LB2. Status report 30 typically indicates the availability of server farm 12 and provides load statistics, which LBI maintains.

LB2 is preferably capable of having multiple virtual IP addresses as is well known. It is a particular feature of the present invention for LB2 to designate a currently unused virtual IP address, such as 200.100.1.1, for LBI's use and store the mapping between the IP address of LB1 and the designated IP address in a triangulation mapping table 32, as is shown more particularly with reference to FIG. 1B. The designated address is referred to herein as the triangulation address and may be preconfigured with LBI or periodically provided to LB1 from LB2. LB1 preferably maintains in a client mapping table 36 a mapping of the IP address 197.1.33.5 of client 26 and the triangulation address 200.100.1.1 of LB2 to which client 26's requests may be redirected.

As shown in the example of FIG. 1A, server status table 22 of LB1 indicates that no servers in server farm 10 are available to service client 26's request, but indicates that server farm 12 is available. Having decided that client 26's request should be forwarded to LB2 in FIG. 1C LB1 substitutes the destination IP address of request 28 with the virtual IP address 200.100.1.1 of LB2 which is now mapped to the IP address of client 26 as per client mapping table 36 and sends an address-modified client request 38 to LB2. LB2, upon receiving request 38 at its virtual IP address 200.100.1.1, checks triangulation mapping table 32 and finds that virtual IP address 200.100.1.1 has been designated for LB1's use. LB2 therefore uses the virtual IP address 100.100.1.0 of LB1 as per triangulation mapping table 32 as the source IP address of an outgoing response 40 that LB2 sends to client 26 after the request has been serviced by one of the servers in server farm 12 selected by LB2. It is appreciated that response 40 must appear to client 26 to come from LB1, otherwise client 26 will simply ignore response 40 as an unsolicited packet. Client 26 may continue to send requests to LB1 which LB1 then forwards requests to LB2 at the designated triangulation address. LB2 directs requests to an available server and sends responses to client 26 indicating LBI as the source IP address.

Reference is now made to FIGS. 2A-2F which, taken together, are simplified pictorial flow illustrations of a network proximity load balancing system constructed and operative in accordance with another preferred embodiment of the present invention. The configuration of the system of FIGS. 2A-2F is substantially similar to FIGS. 1A-1C except as otherwise described hereinbelow. For illustration purposes, a third server farm, generally designated 50, is shown connected to network 14, although it is appreciated that two or more server farms may be provided. Server farm 50 typically comprises a load balancer 52, which may be a dedicated load balancer or a server or router configured to operate as a load balancer, with load balancer 52 being connected to two or more servers 20. Load balancer 52 is alternatively referred to herein as LB3.

Typical operation of the network proximity load balancing system of FIGS. 2A-2F is now described by way of example. As is shown more particularly with reference to FIG. 2A, client 26 is shown sending request 28, such as an FTP or HTTP request, to LB1 whose virtual IP address is 100.100.1.0. LB1 preferably maintains a proximity table 54 indicating subnets and the best server farm site or sites to which requests from a particular subnet should be routed. Determining the "best" site is described in greater detail hereinbelow.

Upon receiving a request, LB1 may decide to service the request or not based on normal load balancing considerations. In any case, LB1 may check proximity table 54 for an entry indicating the subnet corresponding to the subnet of the source IP address of the incoming request. As is shown more particularly with reference to FIG. 2B, if no corresponding entry is found in proximity table 54, LB1 may send a proximity request 56 to LB2, and LB3, whose virtual IP addresses are known in advance to LB1. Proximity request 56 indicates the IP address of client 26.

A "network proximity" may be determined for a requestor such as client 26 with respect to each load balancer/server farm by measuring and collectively considering various attributes of the relationship such as latency, hops between client 26 and each server farm, and the processing capacity and quality of each server farm site. To determine comparative network proximity, LB1, LB2 and LB3 preferably each send a polling request 58 to client 26 using known polling mechanisms. While known polling mechanisms included pinging client 26, sending a TCP ACK message to client 26 may be used where pinging would otherwise fail due to an intervening firewall or NAT device filtering out a polling message. A TCP ACK may be sent to the client's source IP address and port. If the client's request was via a UDP connection, a TCP ACK to the client's source IP address and port 80 may be used. One or both TCP ACK messages should bypass any intervening NAT or firewall and cause client 26 to send a TCP RST message, which may be used to determine both latency and TTL. While TTL does not necessarily indicate the number of hops from the client to the load balancer, comparing TTL values from LB1, LB2, and LB3 should indicate whether it took relatively more or less hops.

Another polling method involves sending a UDP request to a relatively high port number at the client, such as 2090. This request would typically be answered with an "ICMP port unreachable" reply which would indicate the TTL value of the UDP request on arrival at the client. Since the starting TTL value of each outgoing UDP request is known, the actual number of hops to the client may be determined by subtracting the TTL value on arrival at the client from the starting TTL value. A combination of pinging, TCP ACK, UDP, TCP SYN, and other polling techniques may be used since any one polling request might fail.

Figure 2B:
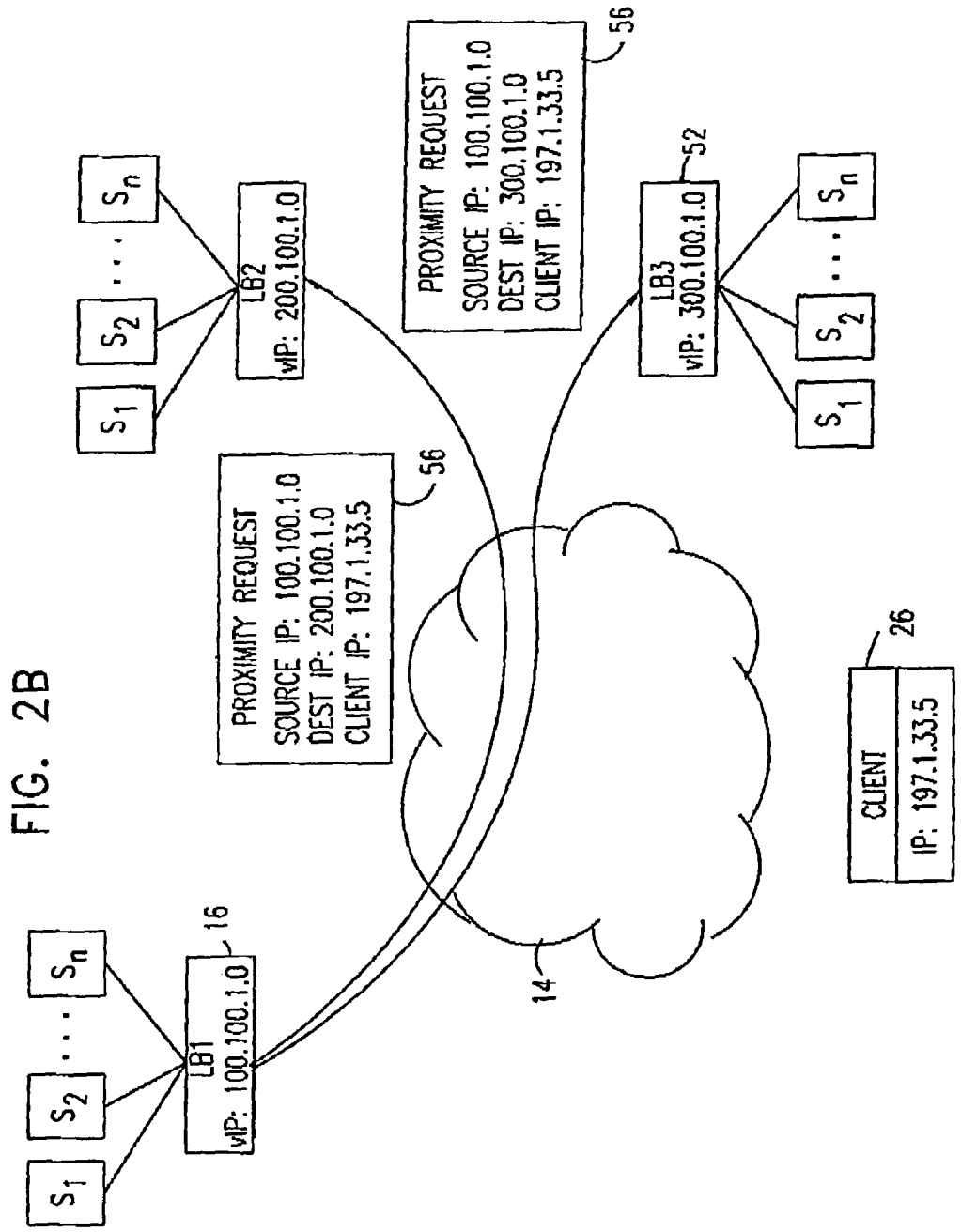
Figure 2D:
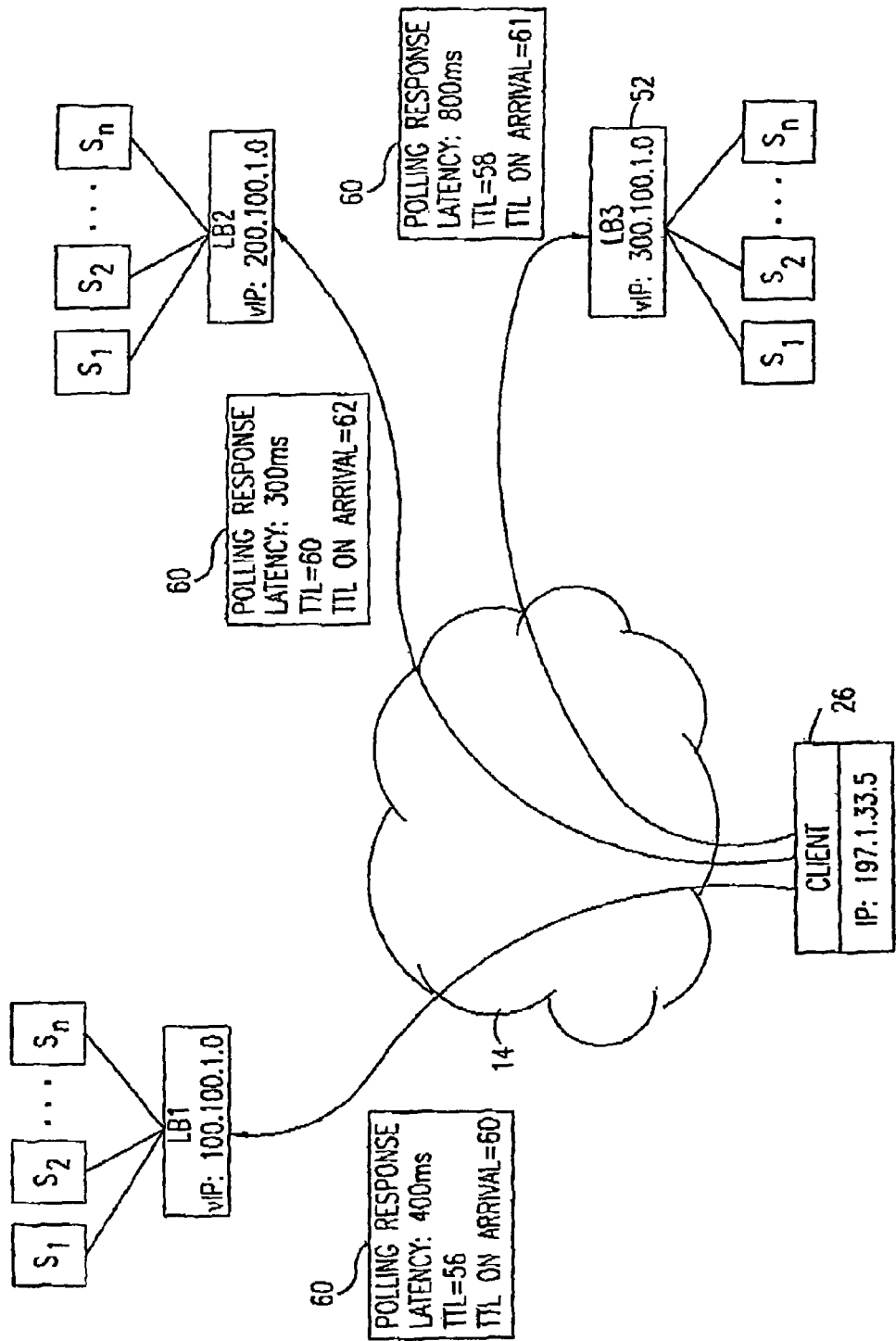
Figure 2E:
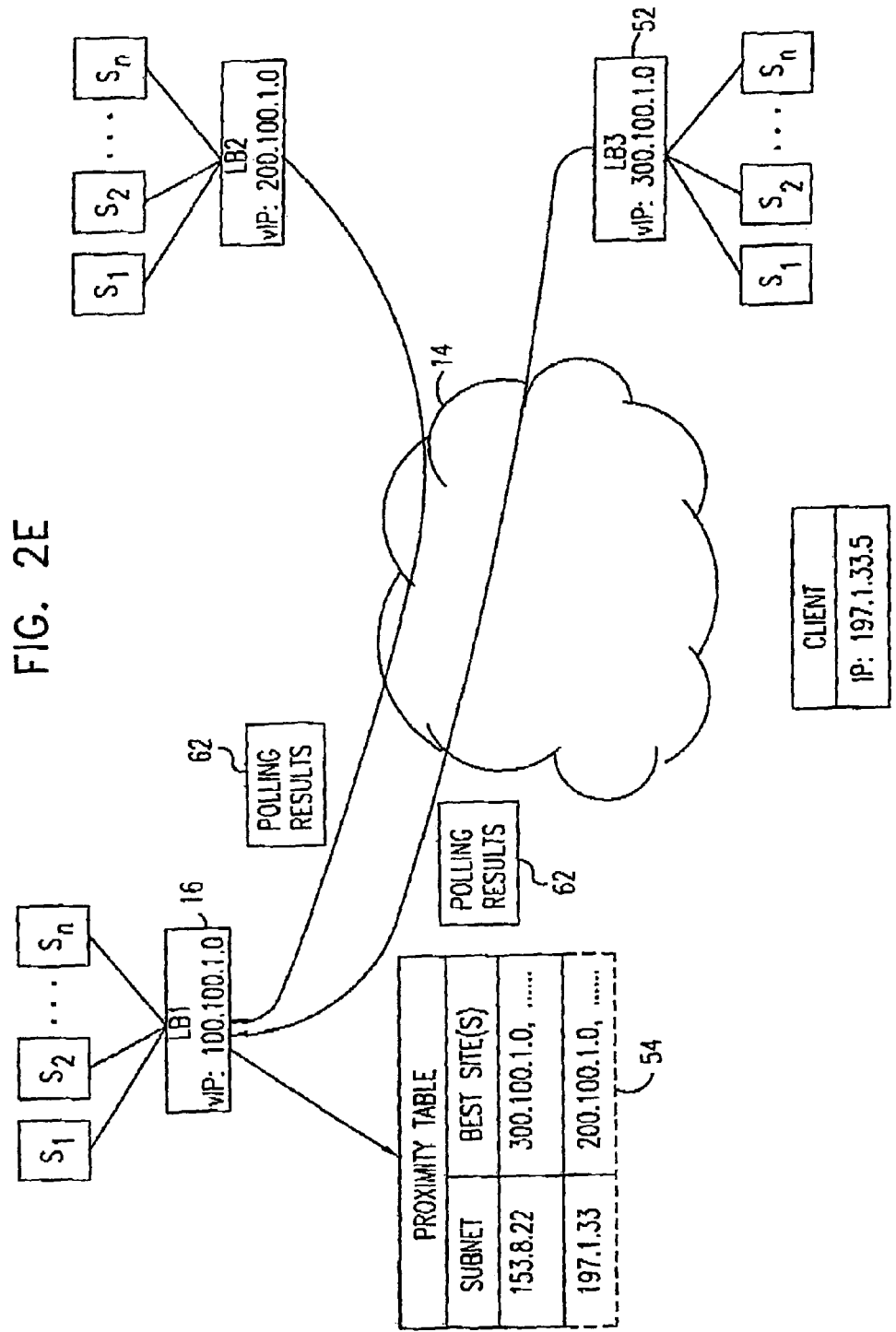

Client 26 is shown in FIG. 2D sending a polling response 60 to the various polling requests. The responses may be used to determine the latency of the transmission, as well as the TTL value. LB2 and LB3 then send polling results 62 to LB1, as shown in FIG. 2E. The polling results may then be compared, and LB1, LB2, and LB3 ranked, such as by weighting each attribute and determining a total weighted value for each server farm. Polling results may be considered together with server farm capacity and availability, such as may be requested and provided using known load balancing reporting techniques or as described hereinabove with reference to FIGS. 1A and 1B, to determine the server farm site that is "closest" to client 26 and, by extension, the client's subnet, which, in the example shown, is determined to be LB2. For example, the closest site may be that which has the lowest total weighted value for all polling, load, and capacity results. LB1 may then store the closest site to the client/subnet in proximity table 54.

As was described above, a load balancer that receives a request from a client may check proximity table 54 for an entry indicating the subnet corresponding to the subnet of the source IP address of the incoming request. Thus, if a corresponding entry is found in proximity table 54, the request is simply routed to the location having the best network proximity. Although the location having the best network proximity to a particular subnet may have already been determined, the load balancer may nevertheless decide to forward an incoming request to a location that does not have the best network proximity should a load report received from the best location indicate that the location is too busy to receive requests. In addition, the best network proximity to a particular subnet may be periodically redetermined, such as at fixed times or after a predetermined amount of time has elapsed from the time the last determination was made.

As is shown more particularly with reference to FIG. 2F, once the closest site for client 26 has been determined, client 26 may be redirected to the closest site using various methods. If a DNS request is received from client 26, LB1 may respond with LB2's address. If an HTTP request is received from client 26, HTTP redirection may be used. Alternatively, regardless of the type of request received from client 26, triangulation as described hereinabove with reference to FIGS. 1A-1C may be used.

The present invention can also be used in a multi-homing environment; i.e., for management of networks that have multiple connections to the Internet through multiple Internet Service Providers (ISPs).

Figure 3A:
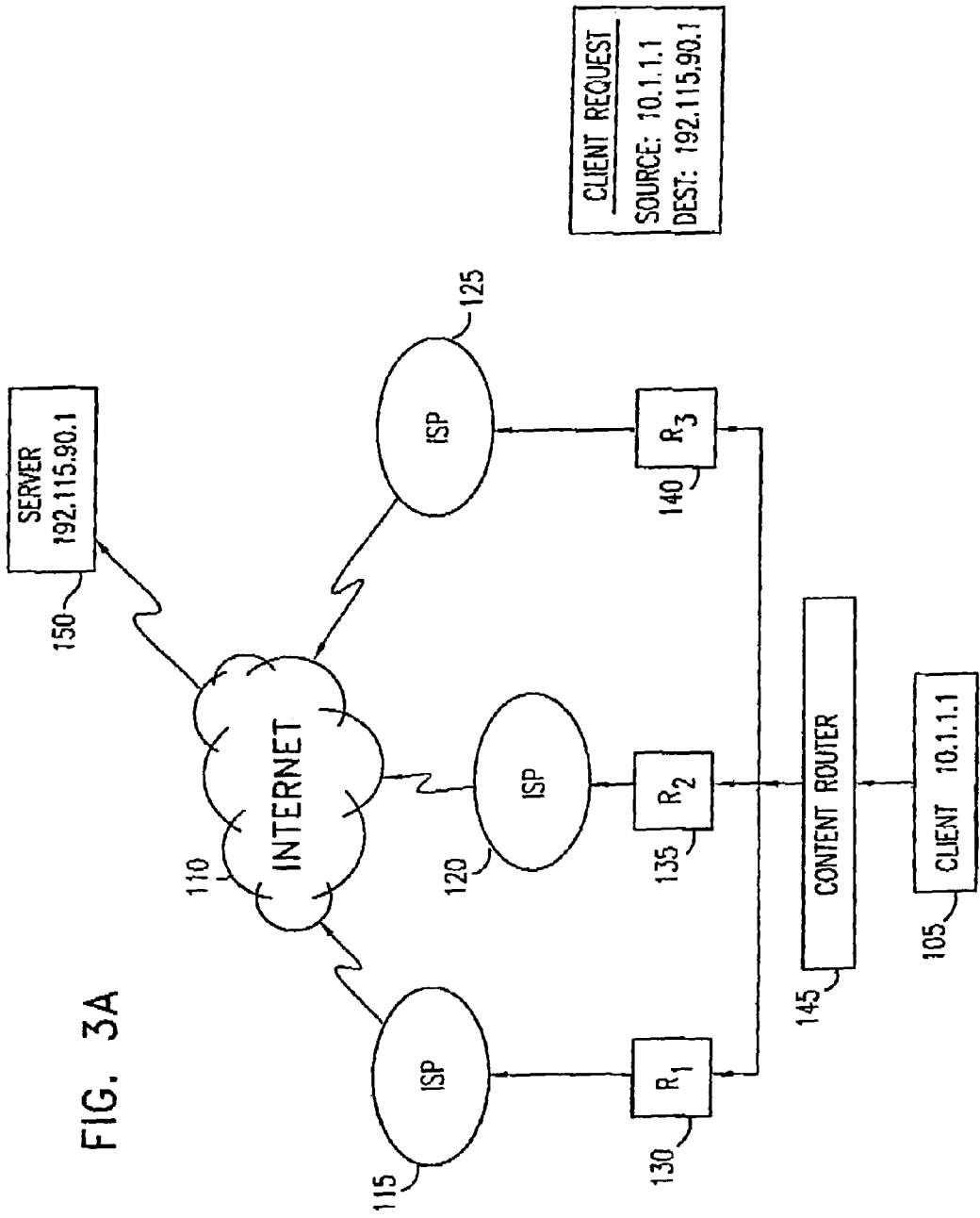
FIGS. 3A-3F, taken together, are simplified pictorial flow illustrations of a preferred embodiment of the present invention for managing and load balancing a multi-homed network architecture whereby a client is connected to the Internet through multiple ISPs.

Reference is now made to FIGS. 3A-3F, which illustrate a preferred embodiment of the present invention for managing and load balancing a multi-homed network architecture whereby a client is connected to the Internet through multiple ISPs. As illustrated in FIG. 3A, a client 105 is connected to the Internet 110 through three ISPs, 115, 120 and 125, each having a respective router 130, 135 and 140 to controls the flow of data packets. The system includes a content router 145, operative in accordance with a preferred embodiment of the present invention, to provide efficient connectivity between client 105 and Internet servers, such as server 150. As illustrated in FIG. 3A, client 105 has an IP address of 10.1.1.1 on a private network, and seeks to connect to server 150 having an IP address of 192.115.90.1.

Figure 3B:
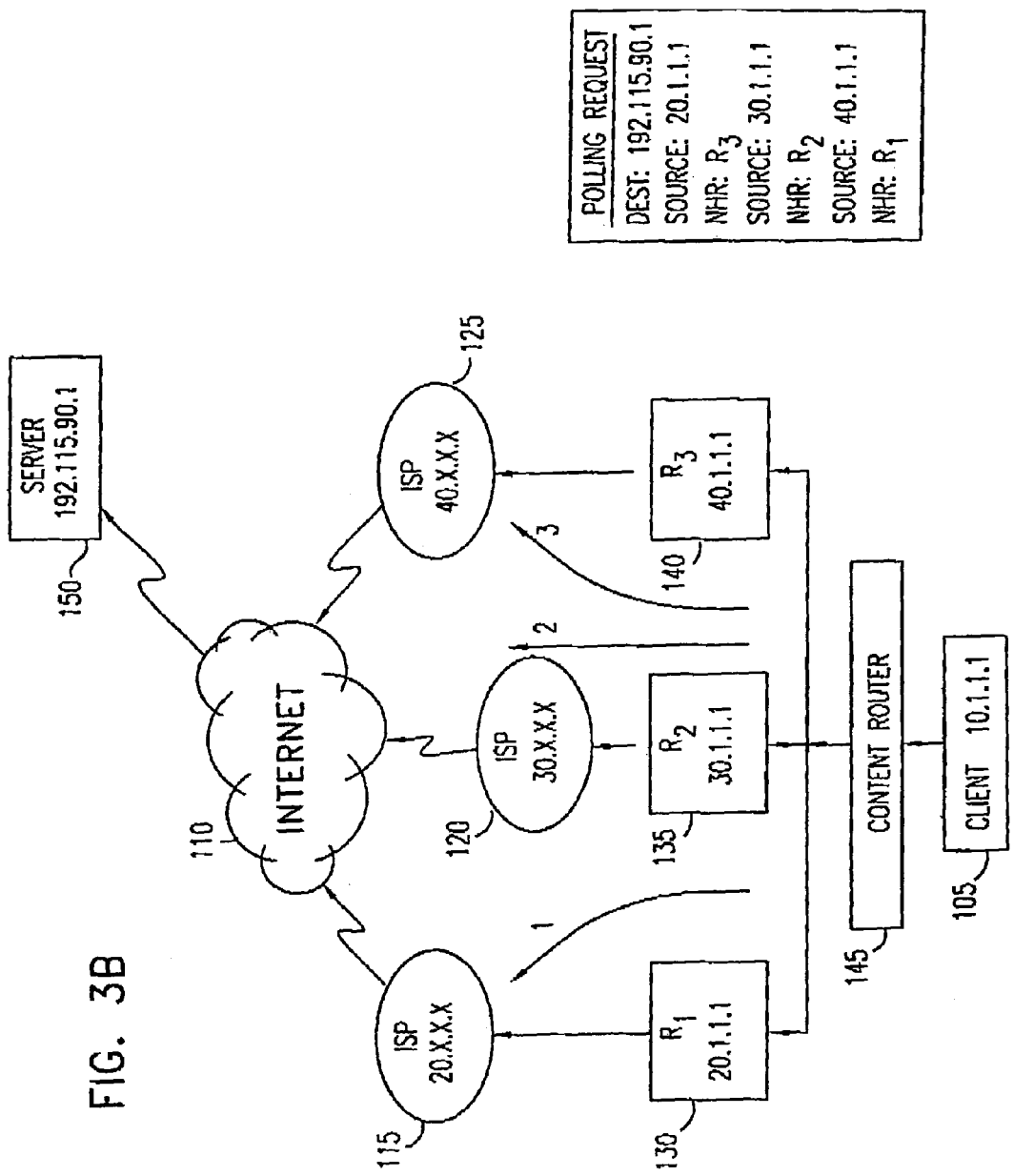

As illustrated in FIG. 3B, ISPs 115, 120 and 125 assign respective IP address ranges to the client network, indicated in FIG. 3B by ranges 20.x.x.x, 30.x.x.x and 40x.x.x. The first time that client 105 connects to server 150, content router 145 preferably sends polling requests through each of routers 130, 135 and 140 in order to determine the proximity of server 150 to client 105. When sending the polling requests, content router 145 assigns respective network addresses 20.1.1.1, 30.1.1.1 and 40.1.1.1 to client 105. Thus three polling requests are sent: one from—each of the sources 20.1.1.1, 30.1.1.1 and 40.1.1.1 to destination 192.115.90.1.

Figure 3C:
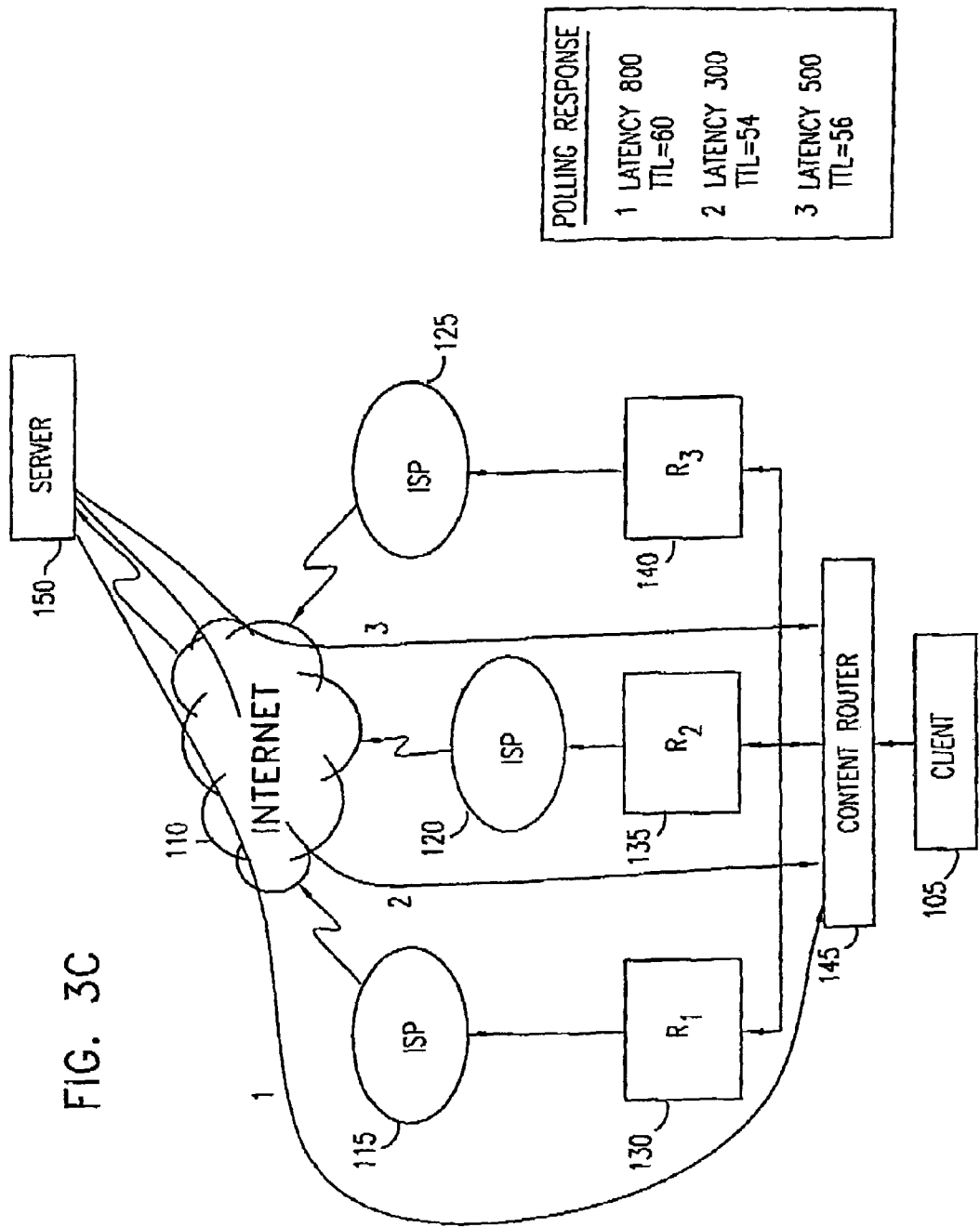

As illustrated in FIG. 3C, server 150 replies to each network address 20.1.1.1, 30.1.1.1 and 40.1.1.1, and the replies are accordingly transmitted through each of the respective ISPs 115, 120 and 125. Each of the replies is measured for latency and number of hops. For example, as illustrated in FIG. 3C, the three replies respective have latency and TTL metrics of 800/60; 300/54; and 500/56.

Figure 3D:
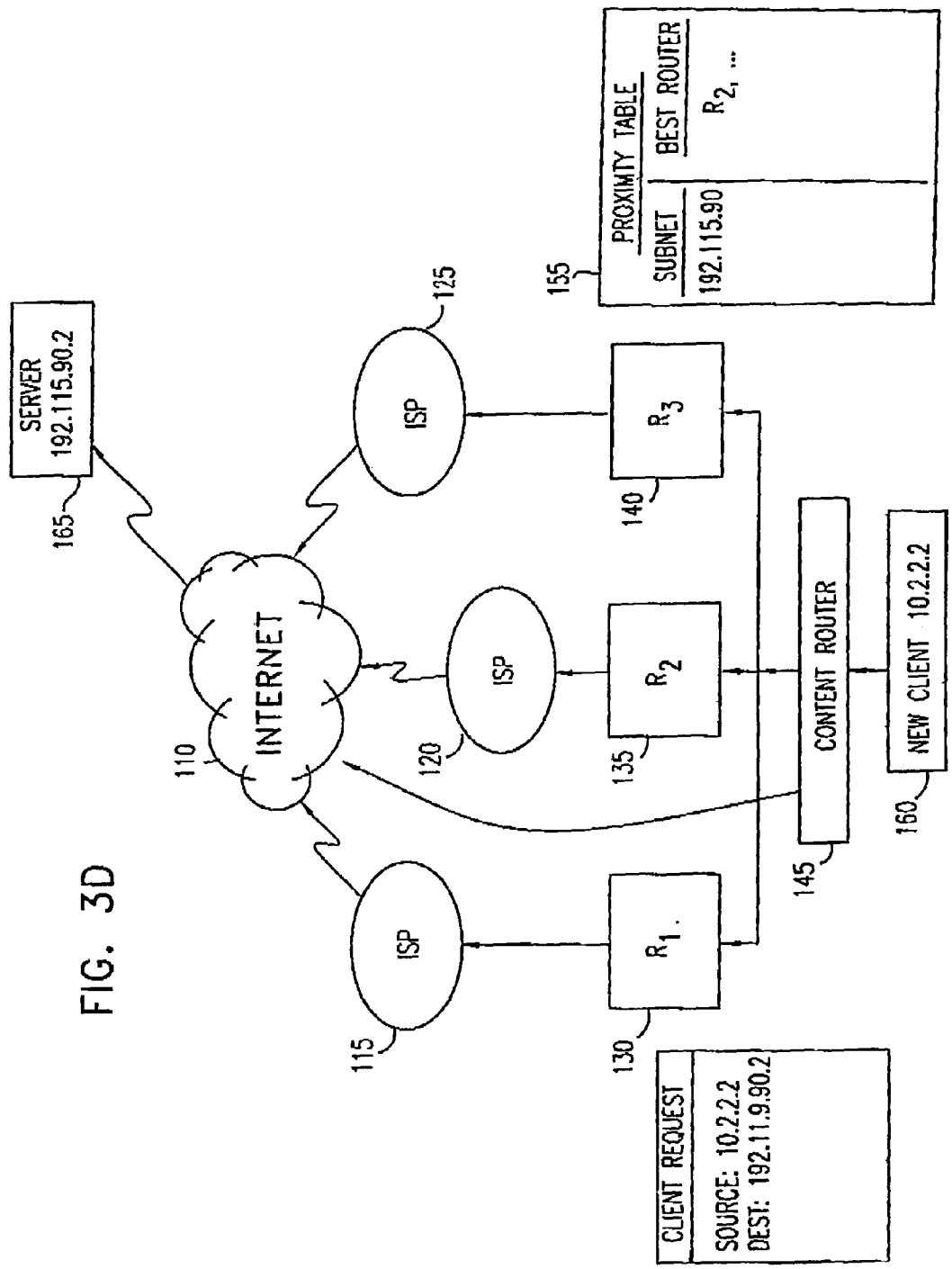

Based on these polling results, content router 145 chooses, for example, router 135 as its first choice for connecting client 105 with server 150. As illustrated in FIG. 3D, proximity results are stored in a proximity table 155. Specifically, proximity table 155 indicates that router 135 is the first choice for connecting content router 145 to any computer residing on subnet 192.115.90. Thus, when a new client 160 with IP address 10.2.2.2 on the private network attempts to connect to a server 165 with IP address 192.115.90.2, through a content router 145, content router 145 determines from proximity table 155 that the best router to use is router 135.

Figure 3E:
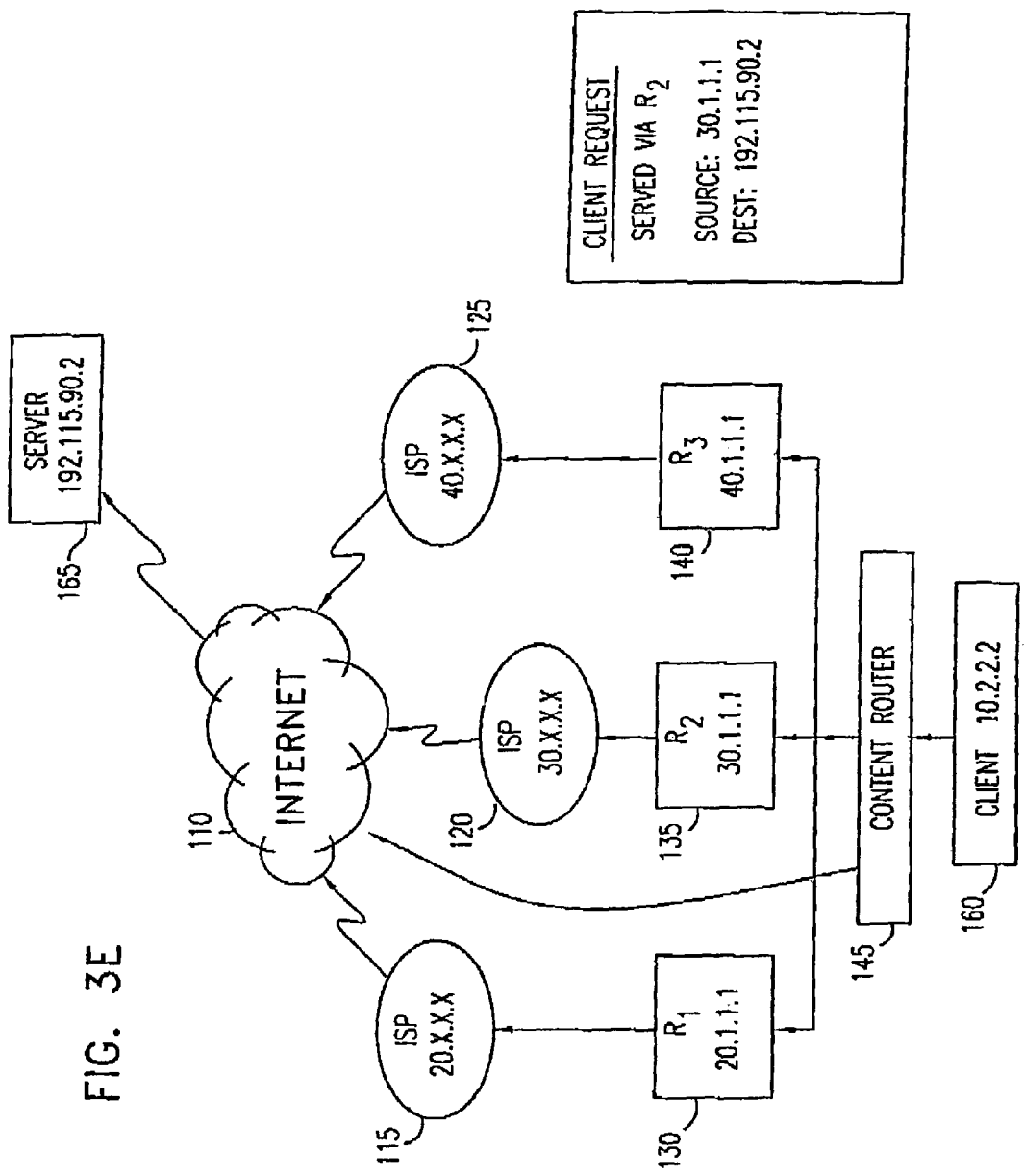

In turn, as illustrated in FIG. 3E, content router 145 sends requests issued from client 160 via router 135, and indicates a source IP address of 30.1.1.1 with each such request, which is the IP address associated with router 135 from within the range of IP addresses allocated by ISP 120.

Figure 3F:
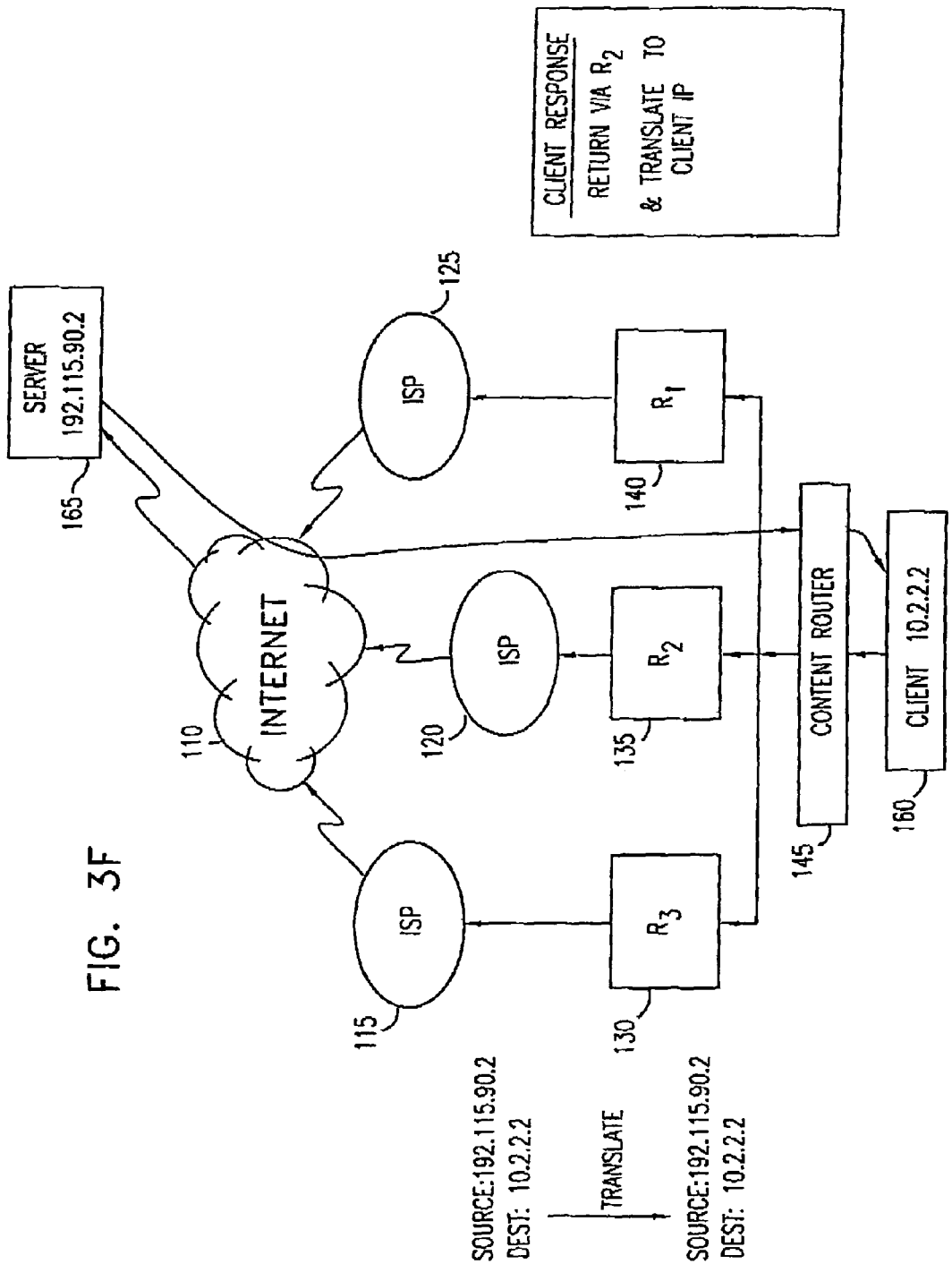

As illustrated in FIG. 3F, this ensures that subsequent responses sent back from server 165 will be addressed to IP address 30.1.1.1 and, accordingly, will be routed through ISP 120. Content router 145 in turn uses network address translation (NAT) data to determine that IP address 30.1.1.1 corresponds to private IP address 10.2.2.2, and transmits the responses from server 165 back to client 160.

Figure 4A:
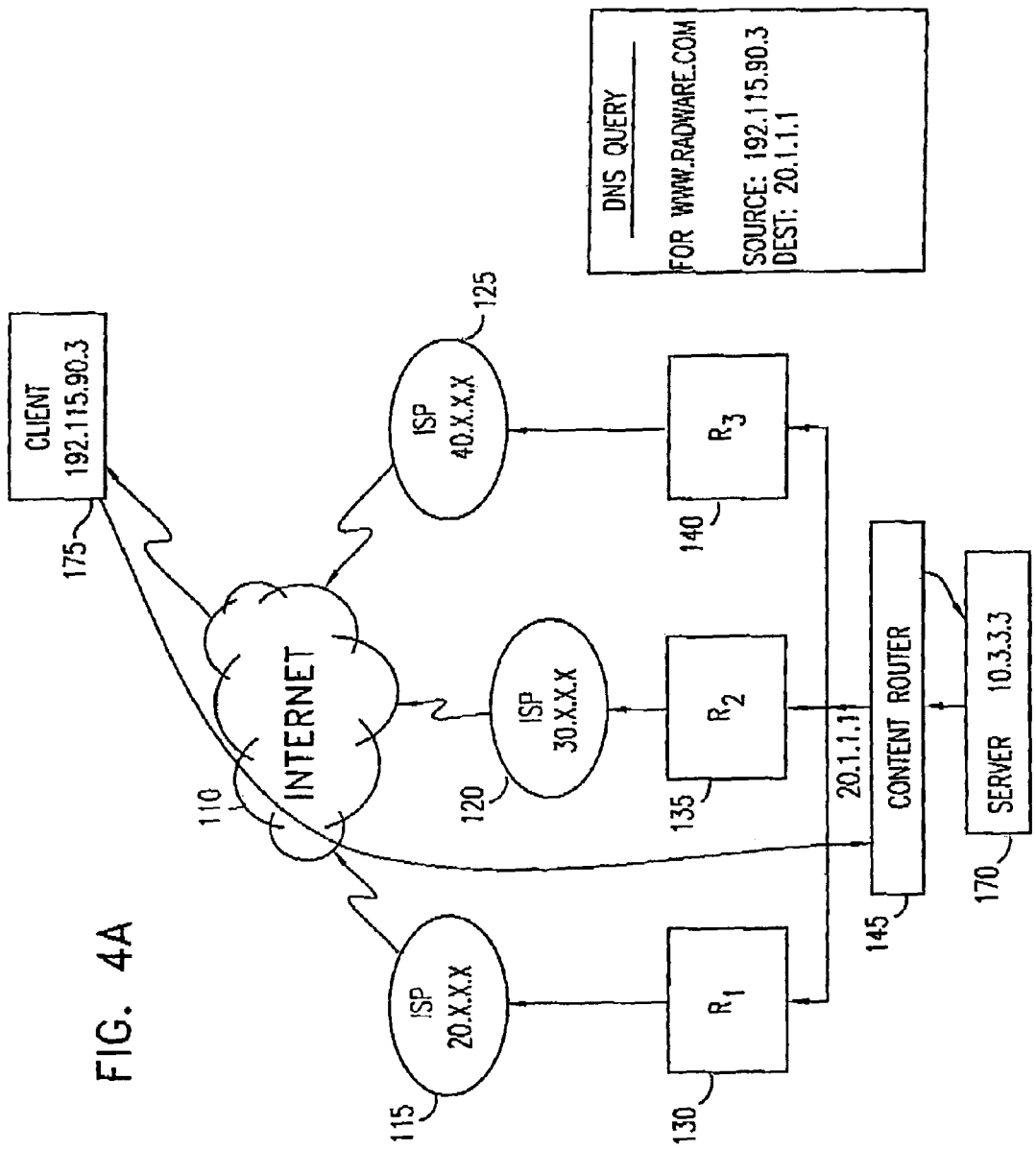
FIGS. 4A and 4B, taken together, are simplified pictorial illustrations of a preferred embodiment of the present invention used to resolve incoming DNS requests for a -multi-homed network architecture.

Reference is now made to FIG. 4A, which illustrates a preferred embodiment of the present invention used to resolve incoming DNS requests for a multi-homed network architecture. Server 170 is assigned IP address 10.3.3.3 within a private multi-homed network, similar to the network illustrated in FIG. 3A. Each of ISPs 115, 120 and 125 assigns a range of IP addresses to the multi-homed network. A DNS request for resolution of a domain name is issued from a client 175 with IP address 192.115.90.3. The DNS request has a source IP address of 192.115.90.3 and a destination IP address of 20.1.1.1. As such, it arrives at content router 145 via router 130.

Figure 4B:
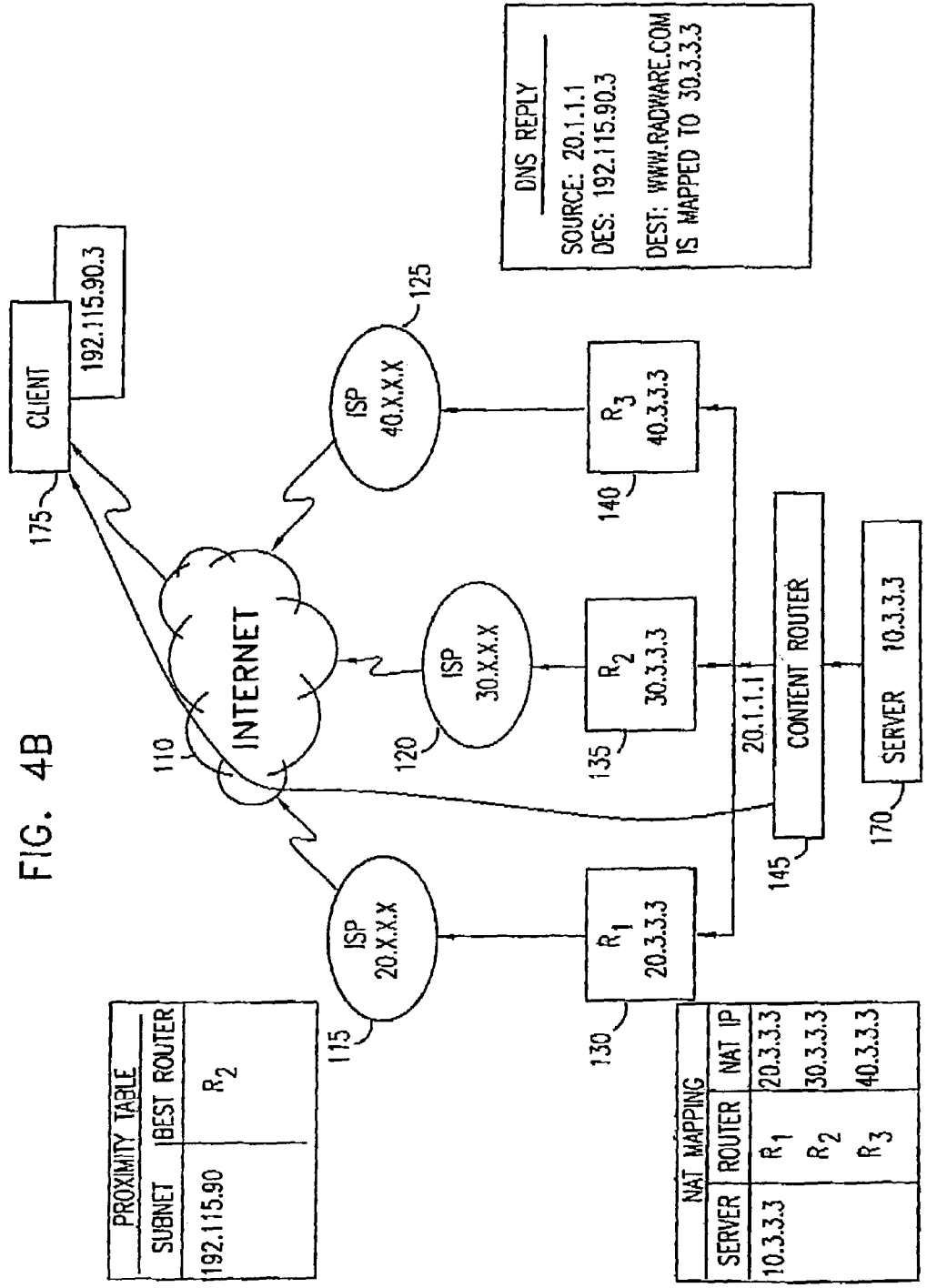

FIG. 4B indicates a NAT mapping table 180, showing that the private IP address 10.3.3.3 for server 170 is translated to IP addresses 20.3.3.3, 30.3.3.3 and 40.3.3.3, respectively, by routers 130, 135 and 140. Content router 145 looks up the subnet entry 192.115.90 in proximity table 155, and identifies router 135 as the first choice for best proximity between server 170 and client 175. In resolving the DNS request, content router 145 accordingly provides 30.3.3.3 as the IP address for server 170. This ensures that requests from client 175 are sent to server 170 with a destination IP address of 30.3.3.3, which in turn ensures that the client requests are transmitted through ISP 120.

It can be seen from FIGS. 3A-3F that the present invention efficiently balances the load among the three ISPs 115, 120 and 125 for outgoing connections. Similarly, it can be seen from FIGS. 4A and 4B that the present invention efficiently balances the load among the three ISPs 115, 120 and 125 for incoming connections. In the event that the router indicated as first choice for the best proximity connection is unavailable or overloaded, the present invention preferably uses a second choice router instead. Thus the present invention ensures that if an ISP service is unavailable, connectivity to the Internet is nevertheless maintained.

Referring back to FIG. 3F, suppose for example that ISP 120 is unavailable, and that content router 145 routes the outgoing client request through ISP 125 instead of through ISP 120. In accordance with a preferred embodiment of the present invention, content router 145 routes the outgoing request through ISP 125 and labels the outgoing request with a source IP address of 40.1.1.1. Had content router 145 used ISP 125 but indicated a source IP address of 30.1.1.1, the response from server 150 would be directed back through ISP 120, and not be able to get through to client 160.

Similarly, referring back to FIG. 4B, suppose for example that ISP 120 is unavailable, and that content router 145 resolves the DNS request with IP address 40.3.3.3 instead of IP address 30.3.3.3. This ensures that client 175 directs its requests through ISP 125, and avoids any blockage at ISP 120.

Figure 5:
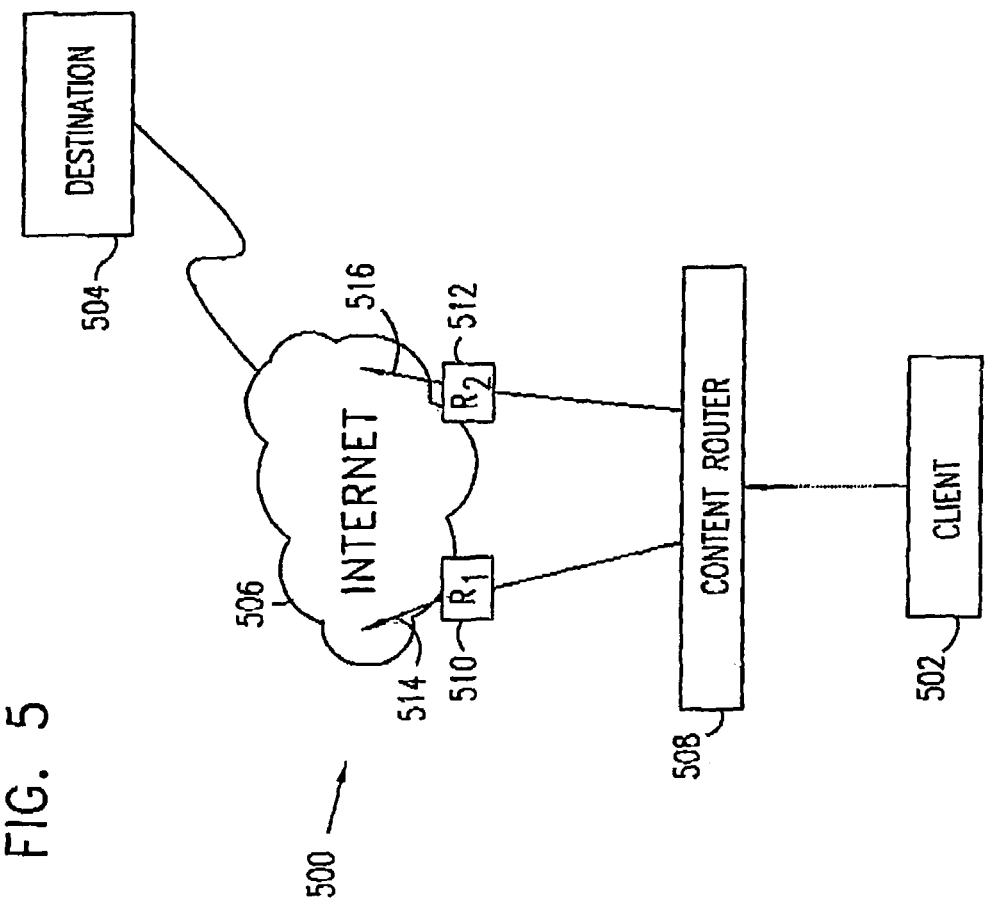
FIG. 5 illustrates a content routing system constructed and operative in accordance with yet another preferred embodiment of the present invention.

Reference is now made to FIG. 5, which illustrates a content routing system 500 constructed and operative in accordance with yet another preferred embodiment of the present invention. The content routing system 500, connects a client 502 to a destination 504 via a network system, such as the Internet network 506, using a content router 508. The content router 508 is connected to the Internet 506 typically via routers, R1 510 and R2 512. The content router 508 presents to the client 502 the most efficient pathway for choosing his connection to the destination 504. The routers 510 and 512 are connected to paths 514 and 516, respectively, and each path possess a path quality factor, QI and Q2, respectively.

The path quality factor Qi is defined as:

Path Quality Factor $Qi=Q$(traffic load; packet loss; link pricing)

The path quality factor, for a given path, is typically dependent on the data content of the data packet. Typical path quality weighting factors are shown in Table 1 for the listed data content. It is appreciated that path quality factor is typically checked periodically, by the content router 508, for each Internet path.

It is appreciated that the managing of the routing by the content router 508, typically depends on the following factors: the content type, the number of hops to the destination, the response time of the destination, the availability of the path, the costing of the link and the average packet loss in the link.

In order for the content router 508 to determine the "best" path, a "Decision Parameter Table" is built for each content type. It is appreciated that the content type may vary between the application type and actual content (URL requested, or any other attribute in the packet). The Decision Parameter Table is preferably dependent on the parameters: Data packet content; Hops weighting factor; Packet loss factor and Response time factor. Typical values of these parameters are also given in Table 1.

TABLE 1

| Content Type | Packet Loss, % | Hops, % | Response Time, % | Path Quality, % |
| --- | --- | --- | --- | --- |
| HTTP | 0 | 20 | 60 | 20 |
| FTP | 30 | 0 | 50 | 20 |
| URL1 | 0 | 30 | 50 | 20 |
| URL2 | 0 | 30 | 50 | 20 |
| File Type 1 | 20 | 20 | 40 | 20 |
| File Type 2 | 20 | 10 | 30 | 40 |
| Telnet | 0 | 0 | 20 | 80 |

In addition to the parameters listed in Table 1, the following additional parameters may also be taken into consideration Hops count factor; Response time factor, Path quality factor; and Packet loss factor.

A Destination Table is built to summarize the following factors: the content type, the number of hops to the destination, the response time of the destination, the availability of the path, and the average packet loss in the link, based on proximity calculations, as previously defined.

Using the relevant data, as typically listed in Table 1, the content router 508 determines a Decision Function $F_{content}$ for each path:

$$F_{content} = F(\text{Hops weighting factor} * \text{Hops count factor};$$
$$\text{Response weighting factor} * \text{Response time factor};$$
$$\text{Path quality weighting factor} * \text{Path quality factor};$$
$$\text{Packet loss weighting factor} * \text{Packet loss factor}).$$

It is appreciated that the above parameters, which are used in the calculation of $F_{content}$, are typically normalized for each path.

Based on the Decision Function the content router 508 selects one of the available paths. The data packet is then routed through the selected path. The Decision Function for a particular path is determined by an administrative manager (not shown) and may depend, for example, on the minimum number of hops or on the relevant response time, or on the packet loss, or on the path quality, or any combination of the above parameters, according to the administrative preferences.

Figure 6:
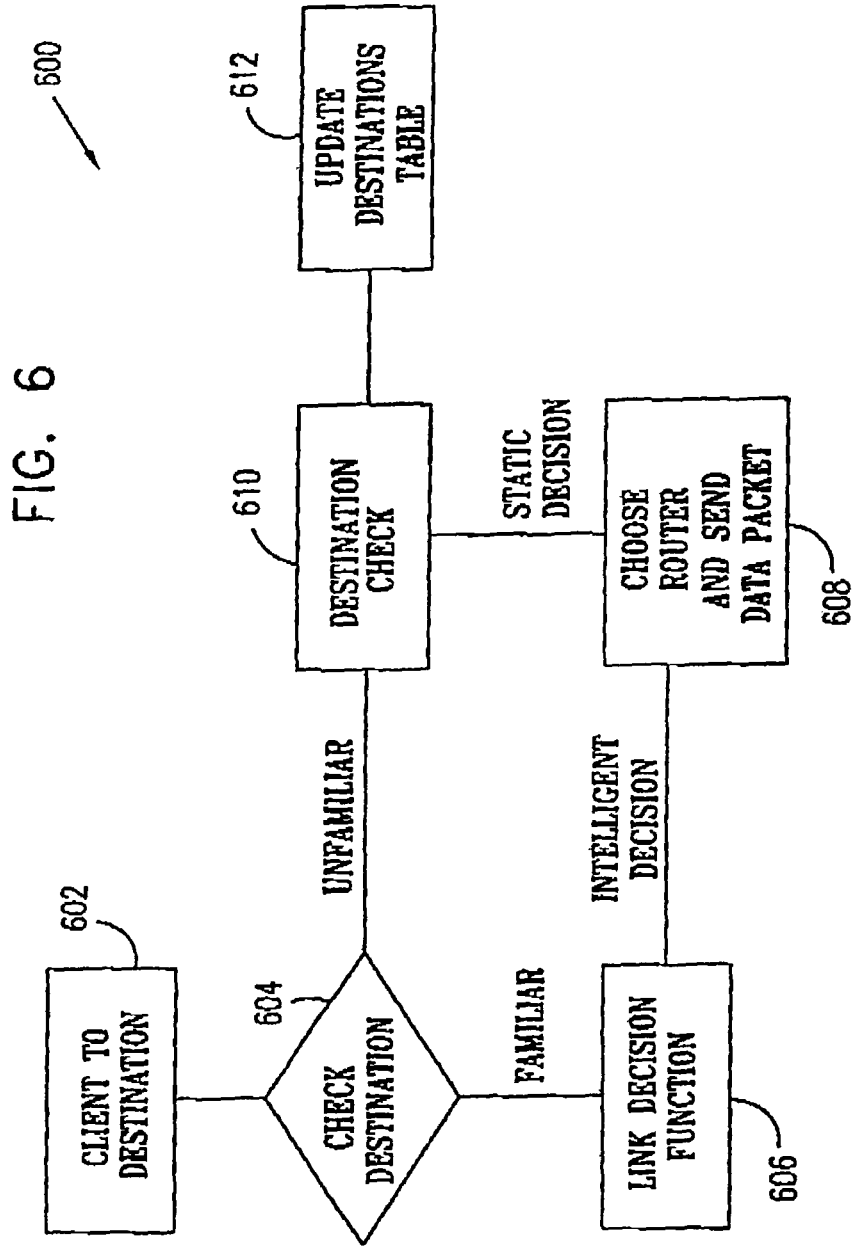
FIG. 6 is a simplified flowchart illustrating the operation of the content router in accordance with another preferred embodiment of the present invention.

The operation of the content router 508 is summarized in the flowchart 600 illustrated in FIG. 6. In the first step 602, the client 502 wishing to send a data packet to the destination 504, sends the data packet (step 602) to the content router 508. The content router 508 preferably first checks (step 604) to determine if the destination 504 is known (familiar) from the Destinations Table (FIG. 7) and that a previous check for the subnet of the destination 504 was already performed. If the destination 504 is familiar, the content router 508 selects a link to the destination 504 using the $F_{content}$ function, taking into account the parameters that were gathered earlier (step 606). The $F_{content}$ function is normalized. The decision made in step 608 is then used by the content router 508 to make the connection with the destination 504 for routing the data packet.

If the destination 504 is unfamiliar, the content router 508 performs a destination check (step 610). The destination check is performed by using the proximity methods, as described hereinabove, by generating actual web traffic towards the destination subnet. This function, as carried out by the content router 508 comprises building a Destination Table (FIG. 7), for each available router and its respective path. The Destination Table may then be used by the content router 508 on the next occasion the client 502 wishes to transfer data packets to the destination 504. Consecutively, the content router 508 chooses the router (step 608) for transferring the data packet to the destination 504. This decision is preferably dependent on the path quality factor, as defined hereinabove.

Thus it may be appreciated that the present invention enables a multi-homed network architecture to realize the full benefits of its redundant route connections by maintaining fault tolerance and by balancing the load among these connections, and preferably using data packet content information in an intelligent decision making process.

It is appreciated that elements of the present invention described hereinabove may be implemented in hardware, software, or any suitable combination thereof using conventional techniques.

It is appreciated that the steps described with reference to FIGS. 1A-1C and 2A-2F need not necessarily be performed in the order shown unless otherwise indicated, and that in fact different implementations of the steps may be employed to yield similar overall results.

It is appreciated, that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for load balancing client requests among a plurality of internet service provider (ISP) links in a multi-homed network, comprising:
   resolving an incoming domain name server (DNS) query for an address associated with a domain name of a server within the multi-homed network, wherein the incoming DNS query is received from a client;
   selecting, based on at least one load balancing criterion, one ISP link from the plurality ISP links; and
   returning an internet protocol (IP) address selected from a range of IP addresses associated with the selected ISP link, thereby subsequent requests from the client are routed through the selected ISP link.

2. The method of claim 1, wherein the at least one load balancing criterion includes availability of each of the ISP link.

3. The method of claim 1, wherein the at least one load balancing criterion includes any one of a round-robin selection parameter and a random selection parameter.

4. The method of claim 1, wherein the at least one load balancing criterion includes a decision function, wherein the decision function is a weighed function of at least one of a load on each ISP link, packet losses on each ISP link, and a cost of each ISP link.

5. The method of claim 1, wherein the least one load balancing criterion includes a measured proximity between the server and each of the ISP links.

6. The method of claim 1, further comprising:
   translating a source IP address of the server to the address of the selected ISP link, thereby responses to the client are routed through the selected ISP link.

7. The method of claim 6, wherein each of the ISP links is connected to a router configured with a range of IP addresses associated with a respective ISP link.

8. A non-transitory computer readable medium having stored thereof computer executable code causing a computer to execute the method of claim 1.

9. A device for load balancing client requests among a plurality of internet service provider (ISP) links in a multi-homed network, comprising:
   a network controller configured to resolve an incoming domain name server (DNS) query for an address associated with a domain name of a server within the multi-homed network, wherein the incoming DNS query is received from a client; and
   a balancer module configured to select, based on at least one load balancing criterion, one ISP link from the plurality ISP links;
   wherein the network controller is further configured to return an internet protocol (IP) address selected from a range of IP addresses associated with the selected ISP link, thereby subsequent requests from the client are routed through the selected ISP link.

10. The device of claim 9, wherein the at least one load balancing criterion includes availability of each of the ISP link.

11. The device of claim 9, wherein the at least one load balancing criterion includes any one of a round-robin selection parameter and a random selection parameter.

12. The device of claim 9, wherein the at least one load balancing criterion includes a decision function, wherein the decision function is a weighed function of at least one of a load on each ISP link, packet losses on each ISP link, and a cost of each ISP link.

13. The device of claim 9, wherein the least one load balancing criterion includes a measured proximity between the server and each of the ISP links.

14. The device of claim 9, wherein the network controller is further configured to translate a source IP address of the server to the address of the selected ISP link, thereby responses to the client are routed through the selected ISP link.

15. The device of claim 14, wherein each of the ISP links is connected to a router configured with a range of IP addresses associated with a respective ISP link.

* * * * *